United States Patent [19]

Cheng-Quispe et al.

[11] E Patent Number: Re. 33,380

[45] Reissued Date of Patent: Oct. 9, 1990

[54] VOICEBAND DATA SET

[75] Inventors: Enrique Cheng-Quispe, Marlboro; Thomas M. Dennis, Ocean; Emanuel J. Fulcomer, Jr., Little Silver; George Malek, Wayside, all of N.J.; Shih Y. Tong, Taipei, Taiwan

[73] Assignee: AT&T Bell Laboratories, Murray Hill, N.J.

[21] Appl. No.: 806,266

[22] Filed: Dec. 6, 1985

Related U.S. Patent Documents

Reissue of:

[64] Patent No.: 4,419,756
Issued: Dec. 6, 1983
Appl. No.: 156,869
Filed: Jun. 5, 1980

[51] Int. Cl.[5] ..... H04B 1/38

[52] U.S. Cl. ..... 375/7; 379/93; 364/900

[58] Field of Search ..... 375/7, 8, 9; 371/22; 370/85, 89, 90; 379/93, 98

[56] References Cited

U.S. PATENT DOCUMENTS

| | | | |
|---|---|---|---|
| Re. 30,037 | 6/1979 | Bass | 371/22 |
| 3,699,525 | 10/1972 | Klavins | 364/200 |
| 4,014,004 | 3/1977 | Fuller | 364/900 |
| 4,019,176 | 4/1977 | Cour et al. | 370/89 |
| 4,071,887 | 1/1978 | Daly | 364/900 |
| 4,071,889 | 1/1978 | Sumida | 364/900 |
| 4,085,449 | 4/1978 | Wash et al. | 364/900 |
| 4,093,981 | 6/1978 | McAllister | 364/200 |
| 4,156,931 | 5/1979 | Adelman et al. | 364/900 |
| 4,263,670 | 4/1981 | Sherman | 375/9 |
| 4,270,202 | 5/1981 | Stuttard et al. | 370/80 |

OTHER PUBLICATIONS

Downing et al., No. 1 ESS Maintenance Plan, Sep. 1964, Bell System Technical Journal, vol. 43, No. 5, pp. 1961–2019.

Choquet et al., Generation of Synchronous Data Transmission Signals by Digital Echo Modulation, Jan. 1971, IBM, Journey of Research & Development, vol. 15, No. 1, pp. 364–377.

Choquet et al., Microcoded Modem Transmitters, 1974, IBM, Journey of Research & Development, vol. 18, No. 1, pp. 338–351.

Sherman et al., "System Description of a Programmable Multiple Data Set" Dec. 1–3, 1975 by National Telecommunication Conference Record, vol. 1, pp. 23-9–23-12.

Murano et al., "LSI Processor for Digital Signal Processing & Its Application to 4800 Bit/s Modem" May 1978 by IEEE Transactions on Communication, vol. Com-26, No. 5, pp. 499–506.

(List continued on next page.)

*Primary Examiner*—Douglas W. Olms
*Assistant Examiner*—Stephen Chin
*Attorney, Agent, or Firm*—Ronald D. Slusky

[57] ABSTRACT

A full duplex, synchronous data set (10) includes primary signal processing circuitry which generates a modulated transmit data signal in response to serial data from a terminal interface (17). The modulated data signal is transmitted over a primary channel of a transmit line (11). The primary signal processing circuitry also receives modulated data signals from a primary channel of a receive line (12) and recovers therefrom a serial bit stream for presentation to the interface. The operating parameters of the primary signal processing circuitry are specified by a primary controller (30) over a plurality of buses (PA, PC, PD). The primary controller includes a microprocessor (310) and associated peripherals (315, 320, 325, 330, 335). The data set also includes secondary signal processing circuitry (40) which transmits and receives diagnostic and control information over respective secondary channels of the transmit line and receive lines. The secondary signal processing circuitry is controlled by a secondry controller (50) over a plurality of buses (SA, SC, SD). The secondary controller also includes a microprocessor (510) and associated peripherals (515, 520, 525, 530, 535). The primary and secondary controllers communicate with each other via a bus interface (60).

61 Claims, 16 Drawing Sheets

OTHER PUBLICATIONS

Wash et al., "Programming a Modem", Nov.-Dec. 19, Conference Record 1976 National Telecommunications Conferences.

Wash et al., "Microprocessor Controlled 4800 B/S Modem; Low Cost Versatility" Jun. 10-14, 1979 by Conference Record 1979 International Conference on Communication, pp. 51.61-51.64.

Van Gerwen et al., "Microprocessor Implementation of High Speed Data Modem" Feb. 1977 by IEEE Transaction on Communication, vol. COM. 25 No. 2, pp. 238-250.

Watanabe, "A 4800 BPS Miroprocessor Data Modem" Jun. 12-15, 1977 by Conference Record 1977 International Conf. on Communication, pp. 47.6-252-47.6-256.

FIG. 8

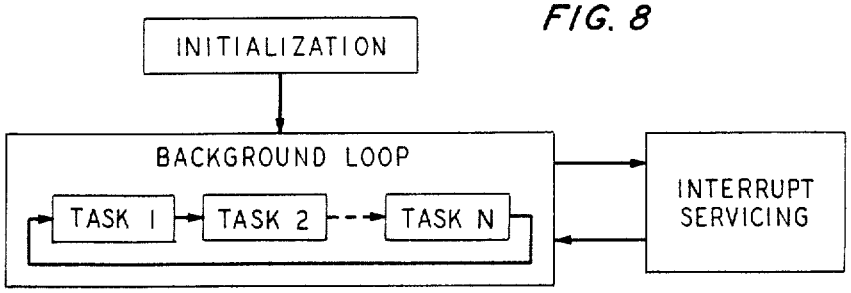

FIG. 9

| | |
|---|---|
| BD TASK | 901 |
| CC TASKS | 911 |
| CC UTILITY ROUTINES | 912 |
| DDU HANDLER TASK | 921 |
| EIA TASKS | 931 |
| EIA TESTS | 932 |
| MO TASK | 941 |
| MO INTERRUPT SERVICE ROUTINES | 942 |
| MO UTILITY ROUTINES | 943 |
| TC TASKS | 951 |
| TC TESTS AND COMMANDS | 952 |
| TC UTILITY ROUTINES | 953 |
| TASK HANDLER | 961 |
| INTERRUPT HANDLER | 962 |
| INITIALIZATION ROUTINES | 963 |
| DATA FILE | 964 |
| GENERAL UTILITY ROUTINES | 965 |

BD = BACKGROUND DIAGNOSTICS
CC = COMMUNICATION CONTROL
DDU = DATA SET DIAGNOSTIC UNIT
MO = MODEM OPERATIONAL
TC = TESTS AND COMMANDS

FIG. 10

TASK TABLE

| STATUS | COUNT | FUNCTION |
|---|---|---|
| ACTIVE | —— | & TASK 1 |
| SUSPEND | —— | & TASK 2 |
| WAIT | 23 | & TASK 3 |
| ⋮ | ⋮ | ⋮ |
| ACTIVE | —— | & TASK N |

1001

| | |
|---|---|
| FIG. 1 | FIG. 3 |
| FIG. 2 | FIG. 4 |

FIG. 12

MENU TABLE

1201

| mnemonic | FLAG | FRONT PANEL FUNCTION | DDU FUNCTION |
|---|---|---|---|
| AUTO | 01----1 | & auto | & autod |
| ⋮ | | | |
| MDCK | 11-----0 | & mdck | & mdckd |
| ⋮ | | | |
| MTNC | 11-----1 | & mtnc | & mtncd |
| ⋮ | | | |
| CHOP | 00----0 | & chop | & chopd |
| ⋮ | | | |
| TRAN | 10----1 | & tran | & trand |
| ⋮ | | | |

| | | |
|---|---|---|
| FIG 13 | FIG 14 | FIG 15 |

| | | |
|---|---|---|
| FIG. 17 | FIG. 18 | FIG. 19 |

VOICEBAND DATA SET

Matter enclosed in heavy brackets [ ] appears in the original patent but forms no part of this reissue specification; matter printed in italics indicates the additions made by reissue.

BACKGROUND OF THE INVENTION

The present invention relates to the transmission of data and, in particular, to data sets.

Workers in the data transmission art, particularly in the area of voiceband data transmission, have suggested various data set, or modem, designs which, in some way, operate under programmed processor, e.g., microprocessor, control. Such designs are disclosed, for example, in K. I. Nordling et al, Proceedings 1976 National Telecommunications Conference, p. 50.2.1 et seq; K. Watanabe et al, Conference Record, 1977 International Conference on Communications, p. 47.6–252 et seq; P. J. Van Gerwin et al, IEEE Trans. on Comm., February 1977, p. 238 et seq; U.S. Pat. No. 4,085,449 issued Apr. 18, 1978 to D. M. Walsh et al.

One advantage of incorporating a programmed processor into a data set is that the design of the data set can be updated relatively inexpensively via program modification both during development of the design and after full-scale manufacturing has begun. Another advantage is that the data set can, with relative ease, be designed to operate with, for example, a number of signaling rates and modulation formats. Moreover, incorporating a programmed processor into the design makes it economically feasible to provide the data set with sophisticated features, particularly in the area of data set and network diagnostics.

In a number of prior art designs, the real-time signal processing of user-provided data and received data signals is performed under program control by the processor itself. In order to ensure that all the processing which needs to be done within one symbol interval can be completed, these designs typically utilize so-called bit-slice processors, at least for high-bit-rate (4800 bit per second or greater) data sets. A drawback of this approach is that bit-slice processors must be custom-designed by the data set designer. This adds to the complexity of the design task. Moreover, it requires expertise in such areas as computer processor architecture and hardware—areas with which the person skilled in the data transmission art may not be familiar.

It may be possible to design a data set which is able to perform the necessary processing using a conventional, e.g., MOS, processor. A drawback, however, is that substantial programming effort must be devoted in such a design to keeping real-time transmit and receive functions from interfering with one another. Another drawback is that no matter whether a conventional or bit-slice processor is used, the processing capability of the processor may be substantially consumed with real-time signal processing tasks, leaving little, if any, processor capability for diagnostics or other functions. A potential way to deal with these drawbacks is to divide the data set functions between two or more processors. There may be difficulty, however, in coordinating their operations.

SUMMARY OF THE INVENTION

In a data set embodying the principles of the present invention, the real-time processing of user-provided data and/or received data signals is performed by special-purpose signal processing circuitry. A controller, which illustratively includes a programmed processor, controls the signal processing circuitry by providing information as to how the signal processing circuitry is to perform the real-time signal processing. The controller provides this information by writing it into various registers within the signal processing circuitry. The registers are individually addressed by the controller to receive information provided on a data bus common to all of the registers.

The controller may, more particularly, specify modes of data set operation, such as modulator state, encoder and decoder signal source, equalizer operating mode, etc. The controller may also specify operating parameter values, such as carrier frequency, bit rate, and ideal reference data to be transmitted during transmitter start-up. It may also specify various signal processing formats, such as scrambler/descrambler and differential encoder/decoder algorithms and modulation formats. The controller does not, however, perform any of the real-time signal processing of user-provided data or received data signals.

This separation of control and real-time signal processing functions is advantageous from at least two standpoints. Since the controller is not required to perform the numerous arithmetic operations attendant to high-speed data signal processing, a relatively slow, commercially available microprocessor can be used in the data set, rather than a custom-designed, high-speed, e.g., bit-slice, processor, as might otherwise be required. Moreover, most of the updating of the data set design, once full-scale manufacturing has begun, is likely to be related to changes in other than the signal processing per se. Thus, it is advantageous to allocate the signal processing functions to special-purpose circuitry and to retain the flexibility provided by a programmed processor principally for off-line (i.e., non-real-time) functions.

The signal processing circuitry is illustratively realized in large-scale-integrated (LSI) circuit form. Although the development costs of LSI circuitry is high, its manufacturing costs are relatively low and, in the long run, a data set comprised of LSI circuits and a conventional processor is, advantageously, more economical to manufacture than one based on bit-slice processor technology.

The capability of the signal processing circuitry to operate in accordance with various operating parameter values and signal processing formats is advantageous in that it allows the same signal processing circuitry and overall data set architecture to be used in a family of data sets, i.e., data sets which operate at various speeds and in accordance with various Bell System, CCITT, or other formats. This capability is also used in the present illustrative embodiment to, for example, effect the changes in data set operation attendant to transitions between start-ups, normal data transmission and recovery, and turn-offs.

In accordance with a feature of the invention, the controller normally operates in a background loop in which it repetitively performs a number of predetermined background tasks related to the management of off-line data set operations and the monitoring of both off-line and real-time operations. To this end, and also to aid the controller in its control of the real-time signal processing, the signal processing circuitry illustratively provides information to the controller via a number of registers from which the controller can read over the above-mentioned data bus. The controller controls the real-time signal processing in response to interrupts generated by the signal processing circuitry upon the occurrence of any of several predetermined signal events. A particular advantage of this approach is that it provides a way for the controller to concurrently control in an orderly way a number of signal processing functions, e.g., both start-ups and turn-offs of both the data set transmitter and receiver circuitry. In particular, upon receiving an interrupt, the controller suspends its execution of the background loop and executes an interrupt service routine which provides to the signal processing circuitry information appropriate to the type of interrupt that was generated. For example, the signal processing circuitry generates an interrupt when the so-called request-to-send lead is raised by the user's terminal equipment. This causes the controller to execute an interrupt service routine which provides information needed by the signal processing circuitry to effect a transmitter start-up.

Two or more interrupt service routines may be associated with a particular type of interrupt. A feature of the invention is that the particular interrupt service routine invoked in response to a particular type of interrupt is determined in the above-mentioned background loop. Thus, when an interrupt is received by the controller, the particular interrupt service routine to be invoked is already known, thereby minimizing the time required to begin interrupt servicing.

Another feature of the invention is that, as part of the above-mentioned background loop, the data set continuously monitors various signals throughout the data set to check that it, and the network connected to it, are operating properly.

Another feature of the invention is that at least portions of the signal processing circuitry may operate in response to programs which are loaded into the signal processing circuitry by the controller prior to the initiation of real-time signal processing by those portions of the circuitry. This feature of the invention further facilitates relatively inexpensive updating of the data set design.

BRIEF DESCRIPTION OF THE DRAWING

The invention will be clearly understood from a consideration of the following detailed description and accompanying drawing in which:

FIG. 8 shows the overall sequence of operations performed by a controller within the data set;

FIG. 9 shows various files stored in a read-only memory within the data set controller;

FIG. 10 shows a task table used by the data set controller;

FIG. 12 shows a menu table to which the data set controller refers in executing various tests and commands initiated by the data set user;

DETAILED DESCRIPTION

Figure 1:
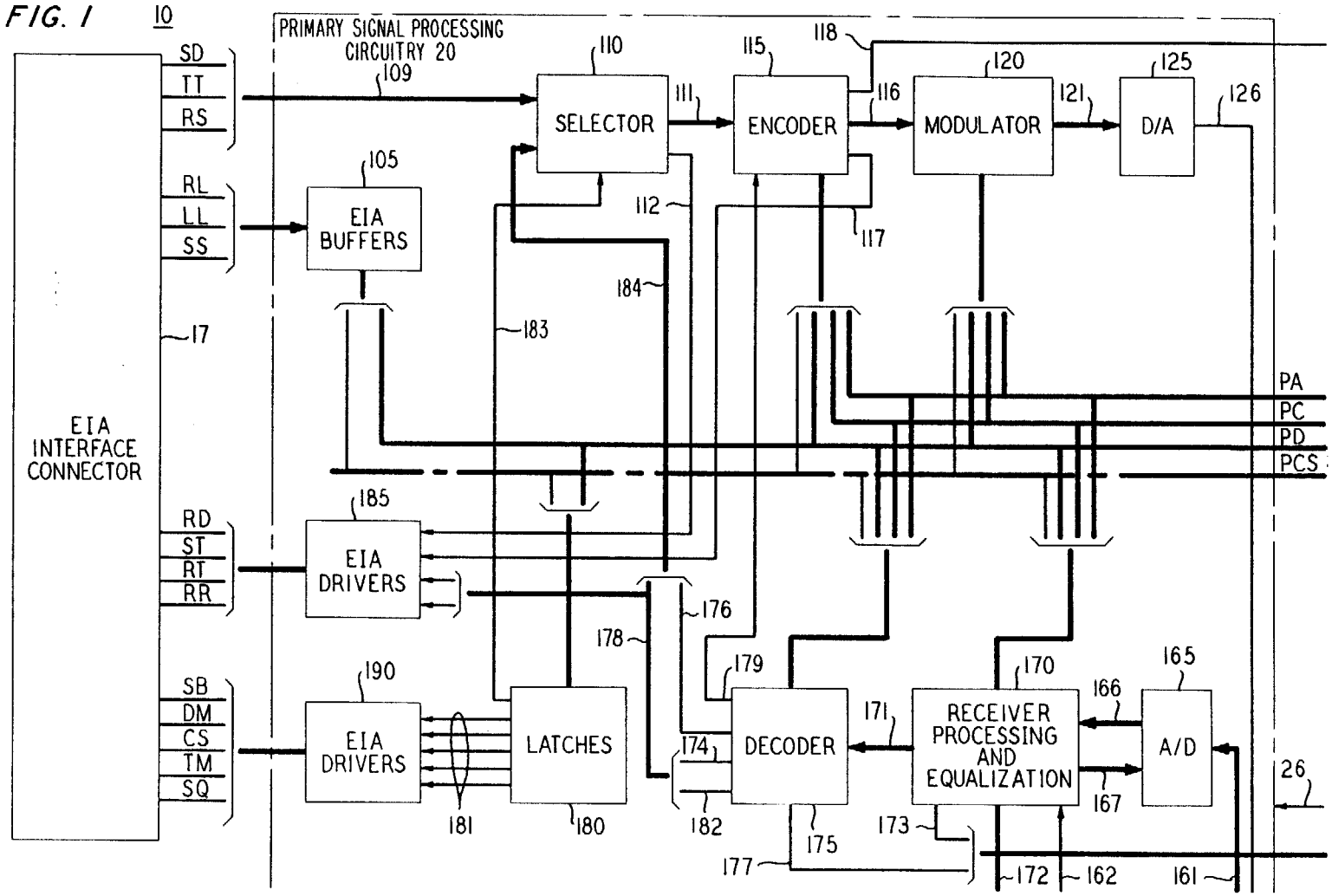
FIGS. 1–4, when arranged as shown in FIG. 5, show a voiceband data set embodying the principles of the invention.
Figure 2:
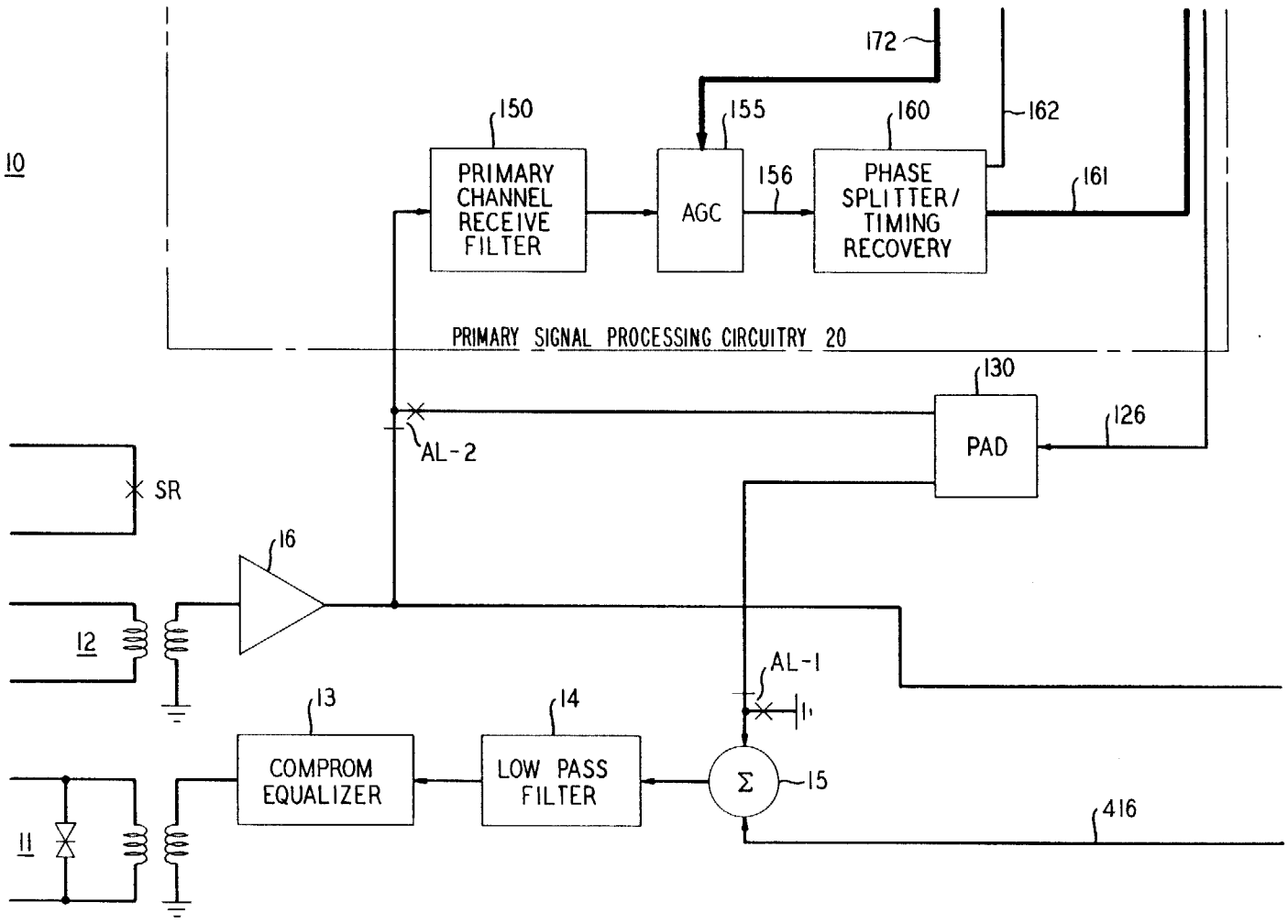
Figure 3:
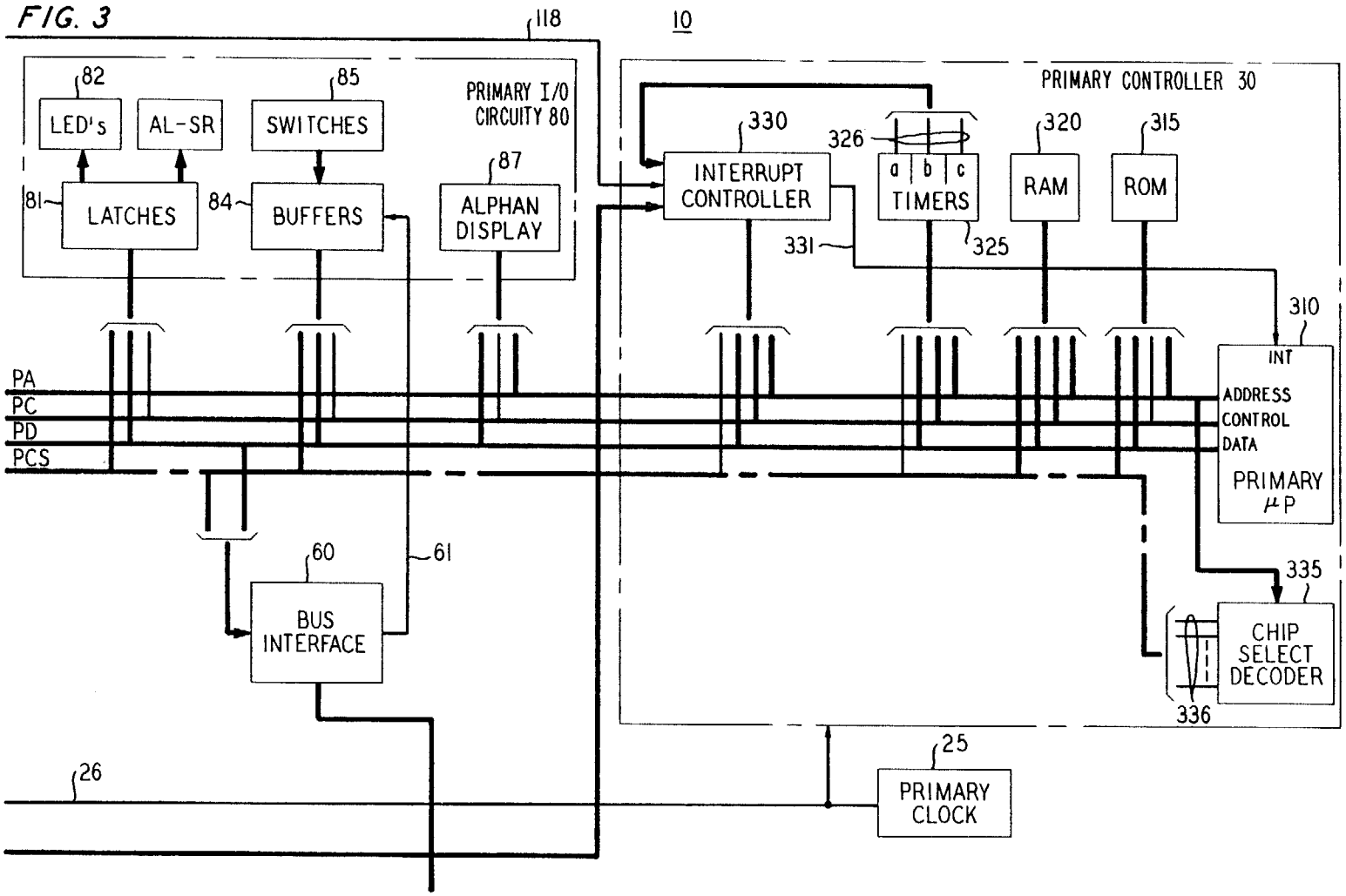
Figure 6:
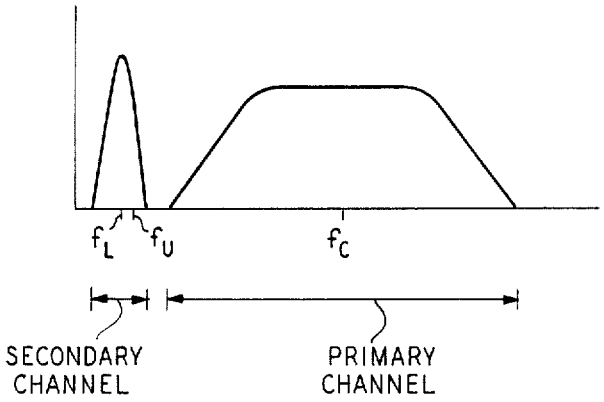
FIG. 6 shows the division of the bandwidth over which the data set operates into primary and secondary channels.
Figures 4, 5:
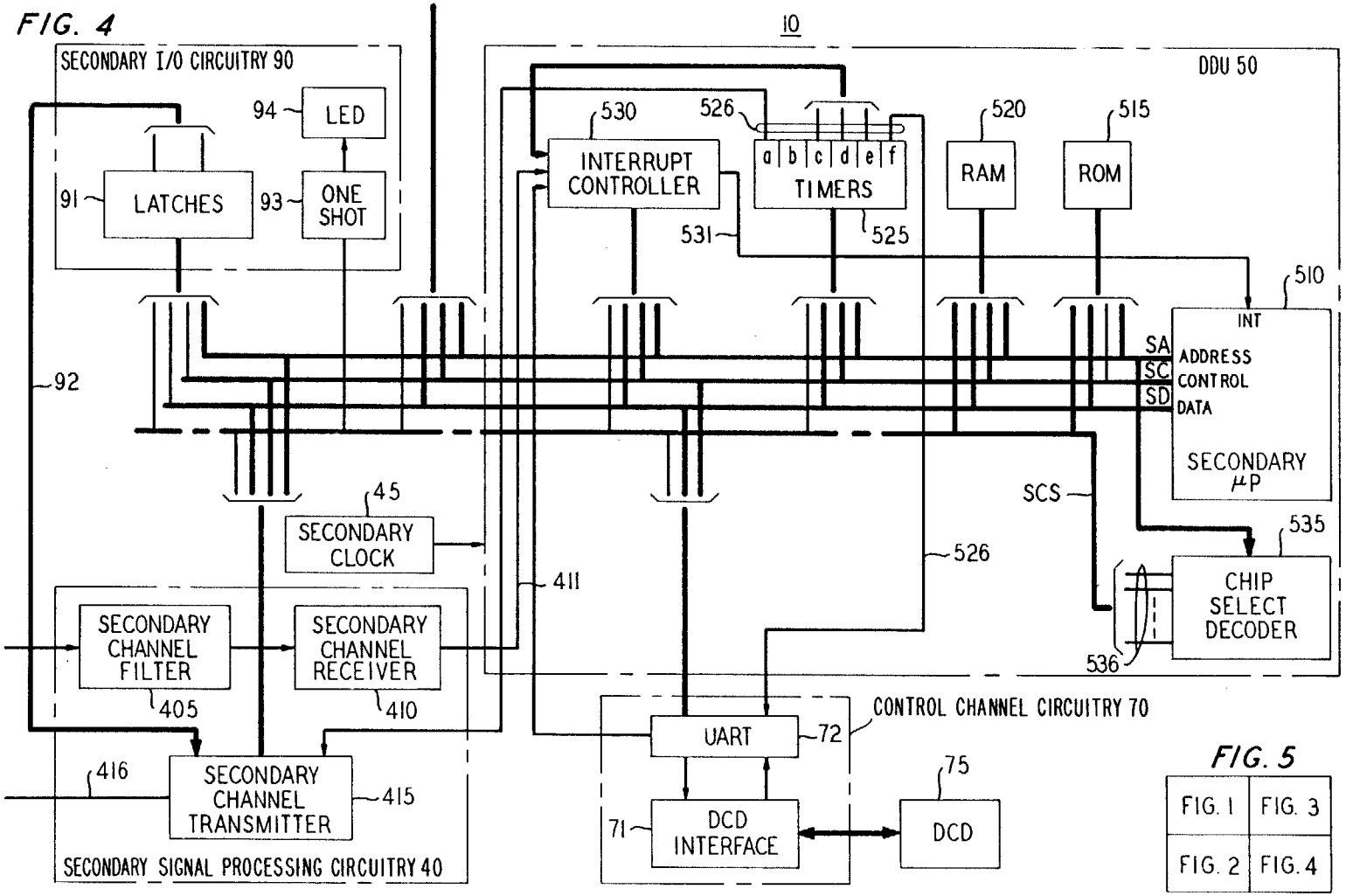

FIGS. 1–4, when arranged as shown in FIG. 5, depict a full duplex, synchronous data set 10. Data set 10 is illustratively a control data set connected to a tributary data set of similar design (not shown) via a four-wire private line comprised of a two-wire transmit line 11 and a two-wire receive line 12. The bandwidth of both the transmit and receive lines is divided into a primary channel and a secondary channel, as shown in FIG. 6. The primary channel carries modulated data and start-up signals and also various test signals. The secondary channel carries diagnostic and control information between the two data sets.

Data set 10 includes primary and secondary channel circuitries which are associated with communications over the primary and secondary channels, respectively. In particular, the primary channel circuitry is comprised of primary signal processing circuit 20, controller 30 and primary input/output (I/O) circuitry 80.

Circuitry 20 performs the real-time processing of user-provided data and received data signals. As will be described in detail hereinbelow, circuitry 20 receives serial data from the user's terminal equipment (not shown) at 4800 bits per second (bps). This signal is scrambled, encoded and formatted into three-bit symbols. It then modulates a carrier of frequency $f_c$ using 8-phase, phase shift keying (PSK), yielding a baud (symbol) rate of 1600. The modulated transmit data signal is transmitted over the primary channel of line 11. Circuitry 20 also receives PSK data signals from the primary channel of line 12, recovers a 4800 bps far-end data stream therefrom and presents it to the user's terminal equipment. In accordance with the invention, circuitry 20 is controlled by controller 30, which provides information to circuitry 20 as to how the latter is to perform the real-time signal processing. Control 30 also controls primary (I/O) circuitry 80. Both circuitry 20 and controller 30 operate in response to a clock signal of approximately 1.8 MHz provided by primary master clock 25 over lead 26.

The secondary channel circuitry, also referred to as the Data Set Diagnostic Unit (DDU), includes secondary signal processing circuitry 40, which is controlled by a secondary controller 50. Controller 50 operates in response to a clock signal, also of approximately 1.8 MHz, provided by secondary master clock 45. Circuitry 40 receives diagnostic and control information from controller 50 and converts it into an FSK signal having upper and lower frequencies $f_U$ and $f_L$. This signal is transmitted over the secondary channel of line 11. In addition, circuitry 40 receives FSK signals from the secondary channel of line 12 and presents a waveform representing the zero crossings of the received signal to controller 50, which recovers the transmitted intelligence.

Controller 50 communicates with controller 30 via a bus interface 60 and communicates with a diagnostic control device (DCD) 75 via a diagnostic channel circuitry 70. Controller 50 also controls secondary I/O circuitry 90.

PRIMARY CHANNEL CIRCUITRY—SYSTEM OPERATION

Primary Signal Processing and I/O Circuitry

Primary signal processing circuitry 20 interfaces with the user's terminal equipment via interface connector 17, which is compatible with EIA standard RS-449. Of the interface leads which extend from the user, the SD (send data), TT (terminal timing), and RS (request-to-send) leads extend via cable 109 through selector 110 to encoder 115 via cable 111. (When the data set is in a digital loopback test mode, selector 110 extends to encoder 115 the signals on cable 184 rather than the signals on cable 109.)

The transmitter portion of circuitry 20 is principally comprised of encoder 115, modulator 120 and D/A converter 125. Encoder 115, in particular, is a large scale integrated (LSI) circuit which processes the input data from the SD lead in preparation for modulation. This processing principally includes the functions of scrambling and differential encoding. The encoder output signal passes over cable 116 to modulator 120—another LSI circuit. The modulator output on cable 121 is a sequence of digital words representing samples of the PSK modulated signal to be transmitted. These are passed to D/A converter 125. The analog output of the latter on lead 126 is passed through a pad 130 and released transfer contact AL-1 of an analog loopback relay AL to one input of summing amplifier 15. The other input to the summing amplifier is the output of secondary channel transmitter 415 within secondary signal processing circuitry 40. The output of summing amplifier 15 is shaped by a transmit low pass filter 14 whence it passes to a compromise equalizer 13. The latter conditions the outgoing signal to compensate for some of the expected channel degradation. The output of equalizer 13 is extended to transmit line 11.

The received data signal from line 12 is brought into the data set through preamplifier 16. The output of the preamplifier extends to secondary channel processing circuitry 40, as discussed more fully below. The output of preamplifier 16 also extends through released transfer contact AL-2 to the receiver portion of circuitry 20.

In particular, the preamplifier output extends to primary channel receive filter 150. Filter 150 removes the secondary channel signal, passing the primary channel signal to an automatic gain control (AGC) circuit 155. The latter sets the correct levels for proper operation of the circuitry which follows.

In particular, the AGC output passes to phase splitter/timing recovery circuit 160 over lead 156. The timing recovery portion of circuit 160 generates a square wave having transitions which correspond to zero crossings of a baud rate tone extracted from the AGC output signal. This square wave is extended to receiver processing and equalization circuit 170 over lead 162 where it is used to control receiver timing. The phase splitter portion of circuit 160 generates a Hilbert transform signal pair on cable 161 in response to the AGC output signal. The Hilbert transform pair is extended to A/D converter 165 which generates digital versions of the Hilbert transform signals one after the other in serial form on a lead within cable 166.

Cable 166 extends to receiver processing and equalization circuit 170, which is comprised of several LSI circuits. Circuit 170 performs such functions as adaptive equalization, demodulation and data decision formation. It presents (presumably correct) decisions as to the values of transmitted data symbols to decoder 175 over cable 171. It also extends a digital word to AGC 155 over cable 172 specifying the AGC gain.

Cable 172 also carries clock signals for AGC 155. Clock signals are also extended to A/D converter 165 over cable 167. Decoder 175, another LSI circuit, performs the inverse functions of encoder 115, e.g., differential decoding and de-scrambling. Receive timing and receiver ready signals generated by decoder 175 on leads 174 and 182 are respectively extended to the ones of EIA drivers 185 associated with the RT and RR leads of interface connector 17 via cable 178. In normal operation the RD (receive data) lead of connector 17, carrying the recovered far-end data, also receives its signal via one of drivers 185 from decoder 175. This signal is routed to the driver via decoder output lead 176, cable 184, selector 110 and lead 112. The ST (send timing) lead of connector 17 receives its signal from encoder 115 via lead 117 and another one of EIA drivers 185.

In addition to the receive data signal on lead 176, cable 184 carries the receive timing and receiver ready signals from cable 178. During digital loopback tests, the signals on cable 184, rather than the signals on cable 109, are extended by selector 110 to encoder 115, and selector 110 extends ground potential to the one of EIA drivers 185 associated with the RD lead of connector 17.

Other leads of connector 17 include SB (standby), DM (data mode), CS (clear to send), TM (test mode) and SQ (signal quality). These signals are provided by respective ones of EIA drivers 190 via latches 180 and leads 181. (Another one of latches 180 provides a signal to selector 110 via lead 183 indicating whether the data set is to be in the normal or digital loopback mode.) Further description of the LSI circuits of circuitry 20 is given in a separate section hereinbelow.

Figure 7:
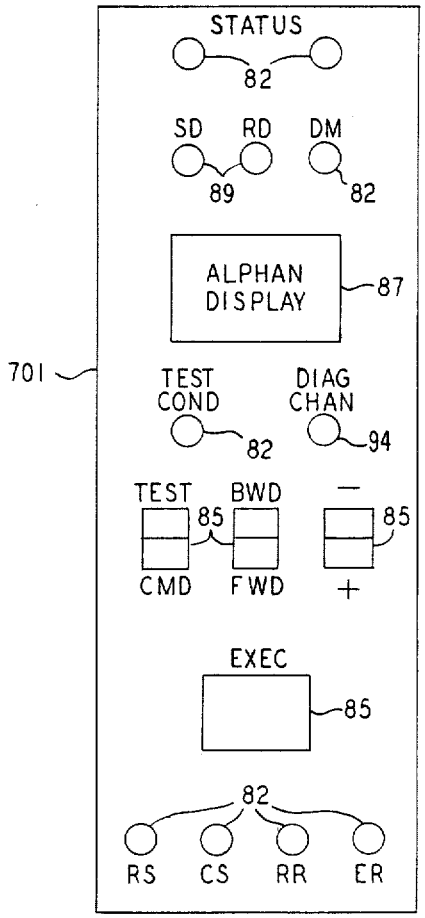
FIG. 7 depicts the front panel of the data set.

Primary I/O circuitry 80 includes a set of latches 81. Individual ones of latches 81 control the states of LED indicators 82 disposed on front panel 701 of the data set, which is shown in FIG. 7. The two status indicators are red and green, respectively. The green indicator is on when both data set 10 and the far end data set are operating normally; otherwise, the red indicator is on. The DM (data mode) indicator is on if the data set is available to carry user-provided data, as opposed to being in a test condition. The TEST CONDITION indicator is on when a test which is disruptive of normal communications over the primary channel is in progress. (The DM and TM leads of interface 17 are raised when these indicators are on.) The RS, CS and RR indicators show the state of the corresponding EIA interface leads. The ER indicator is on when data set equalizer is in a retrain mode. (SD and RD indicators 89 of panel 701 are driven directly from the corresponding EIA interface leads via buffers not shown. Diagnostic channel indicator 94 is controlled by secondary channel circuitry.)

Other ones of latches 81 control various relays in the data set, such as analog loopback relay and a select standby relay SR.

I/O circuitry 80 also includes a set of buffers 84 through which the positions of various front panel switches 85 can be read. These are operated by the user to issue commands to the data set and to request that it perform various tests on itself and/or the network to which it is connected. Other ones of switches 85 (not shown in the drawing) define a local address for the data set. When diagnostic control device (DCD) 75 is associated with a number of data sets co-located with data set 10, this local address provides the DCD with a way of directing its communications to data set 10. In addition, signals from bus interface 60 can also be read through ones of buffers 84.

I/O circuitry 80 also includes a four-character alphanumeric display 87. When data set or network faults are detected, the display is used to indicate their nature to the user. In addition, the data set uses display 87 to present mnemonics for the tests and commands which the user can order the data set to execute. It also uses the display to present test results, for example, in the form of a word (PASS) or a measurement (03 DB).

Primary Controller

Primary controller 30 includes a microprocessor 310 and associated peripherals including read only memory (ROM) 315, random access memory (RAM) 320, timer circuitry 325, interrupt controller 330 and chip select decoder 335. Controller 30 communicates with its peripherals and the rest of the data set by writing information into, and reading information out of, registers, buffers and/or latches throughout the data set. This communication is carried out via three buses—primary address bus PA, primary control bus PC, primary data bus PD—and a primary chip select cable PCS.

The leads 336 of cable PCS are derived by chip select decoder 335 from a subset of the address bus leads. The leads of cable PCS extend to various integrated circuit chips or groups of chips (e.g., ROM 315) within the data set. When it is desired to communicate with a particular device, i.e., register, buffer or latch, microprocessor 310 provides on bus PA an address unique thereto. Decoder 335 provides a signal on an appropriate one of leads 336 indicating that the controller wishes to communicate with the device in question. If more than one device is associated with a particular chip select lead, the particular circuit desired to be communicated with is identified by an address on bus PA.

Data bus PD is a bidirectional 8-bit bus over which the information itself is carried. Control bus is a two-bit bus having a read lead and a write lead. Activation of the write lead means that information provided on bus PD is to be written in a register or latch which has been addressed. Activation of the read lead means that information is to be provided on bus PD by the register or buffer which has been addressed.

Not all leads of all buses extend to each circuit with which controller 30 communicates. For example, latches (buffers) receive only the write (read) lead of the control bus. In addition, the various integrated circuits comprising the data set may receive less than the full number of address leads, depending on the number of addressable elements contained therein.

Some of the functional blocks shown in FIGS. 1–4, e.g., latches 81 and bus interface 60, receive more than one chip select lead, as indicated by a cable, rather than a lead, tap off of chip select cable PSC. Buffers used to drive the three buses and cable PSC are not shown in the drawing.

The overall operation of controller 30 in accordance with a feature of the invention is depicted in FIG. 8. Firstly, controller 30 initializes itself and the rest of the data set. It then enters a background loop in which it repetitively performs a number of predetermined background "tasks" related to the management and monitoring of off-line data set operations and the monitoring of both off-line and real-time operations. (One pass through the background loop requires about 15 ms.) Operations of the controller which relate to the control of the real-time signal processing (as well as some other operations) are handled on an interrupt basis. Interrupts are generated, for example, in response to various signal events within circuitry 20. As a particular example, an interrupt is generated by encoder 115 when the RS (request-to-send) lead is raised by the user's terminal equipment. The reception of an interrupt causes controller 30 to suspend its execution of the background loop and to service the interrupt via an appropriate interrupt service routine.

The interrupt service routine causes controller 30 to write into respective registers of circuitry 20 various operating mode, operating parameter and/or signal format information signal values appropriate to the type of interrupt generated. For example, in the case of an interrupt generated by a raising of the RS lead, controller 30 performs operations such as configuring encoder 115 for start-up, turning on modulator 120, loading (jamming) ideal reference (start-up) data into encoder 115, configuring encoder 115 for normal operation, and raising the CS (clear-to-send) lead.

Once an interrupt service routine (or any phase thereof which is separated from the following phase by a significant times interval) is completed, controller 30 returns to the background loop at the place where it left.

The various programs, routines and data files used by controller 30 in carrying out the above-described three functions are stored in individual files within ROM 315. As shown in FIG. 9, these files can be conceptually divided into seven categories—background diagnostics file 901, communication control files 911 and 912, DDU file 921, EIA files 931 and 932, modem operational files 941–943, test and command files 951–953 and utility files 961–965.

Each of the first six file categories includes one or more file types. For example, several of the categories include utility routines. These routines define operations which are common to at least two other routines within that category and are called by these other routines, as needed. In a similar vein, general utility routines 965 define operations which are common the routines in various of the categories. The functions of the other file types are explained at appropriate points in the sequel.

Overall control of the three basic functions of controller 30—initialization, background loop, and interrupt servicing—is provided by files within the utility category, these being initialization routines 963, task handler 961 and interrupt handler 962. The operation of each of these will now be described.

Primary Controller

Operation—Initialization/Background Loop

Controller 30 is controlled by initialization routines 963 when power is applied to the data set. During initialization, various pointers within the microprocessor are set and various registers within the microprocessor are cleared. Latches, such as latches 180, are set to predetermined (e.g., cleared) states. In addition, numerous operating mode signals held in registers within the data set—principally within circuitry 20—are set to predetermined initial values. These include, for example, a signal which specifies the state (on or off) of the modulator, signals which specify the signal sources for the encoder and decoder, signals which specify various operating modes for the equalizer, etc.

A further initialization function is to specify various operating parameter values and signal processing formats for the LSI circuits of circuitry 20. Although data set 10 operates with 8-phase PSK having predetermined differential encoding and scrambling, predetermined carrier frequency, predetermined start-up protocols, etc., a feature of the present invention is that circuitry 20 is capable of operating in accordance with various operating parameters and signal processing formats. For example, modulator 120 is capable of implementing (a) phase shift keying (PSK) using 100 percent excess bandwidth at 1200 baud, (b) PSK using 50 percent excess bandwidth at 1600 baud and (c) quadrature amplitude modulation (QAM) using 12 percent excess bandwidth at 2400 baud. It can operate over a wide range of carrier frequency. Encoder 115 is capable of implementing any of a number of scrambling and differential encoding algorithms and QAM signal constellations. Receiver processing and equalization circuit 170 and decoder 175 are similarly flexible.

At this time, then, the encoder and decoder receive information as to the scrambling/descrambling and differential encoding/decoding algorithms to be initially used, i.e., during transmitter and receiver start-up. These may be changed later as, for example, when transition is made from transmitter start-up to normal transmitter operation. Modulator 120 and receiver processing and equalization circuit 170 receive information as to which of the three above-mentioned modulation formats are to be used (in this case, format (b)) and also what the carrier frequency is—illustratively 1800 Hz.

Figure 11:
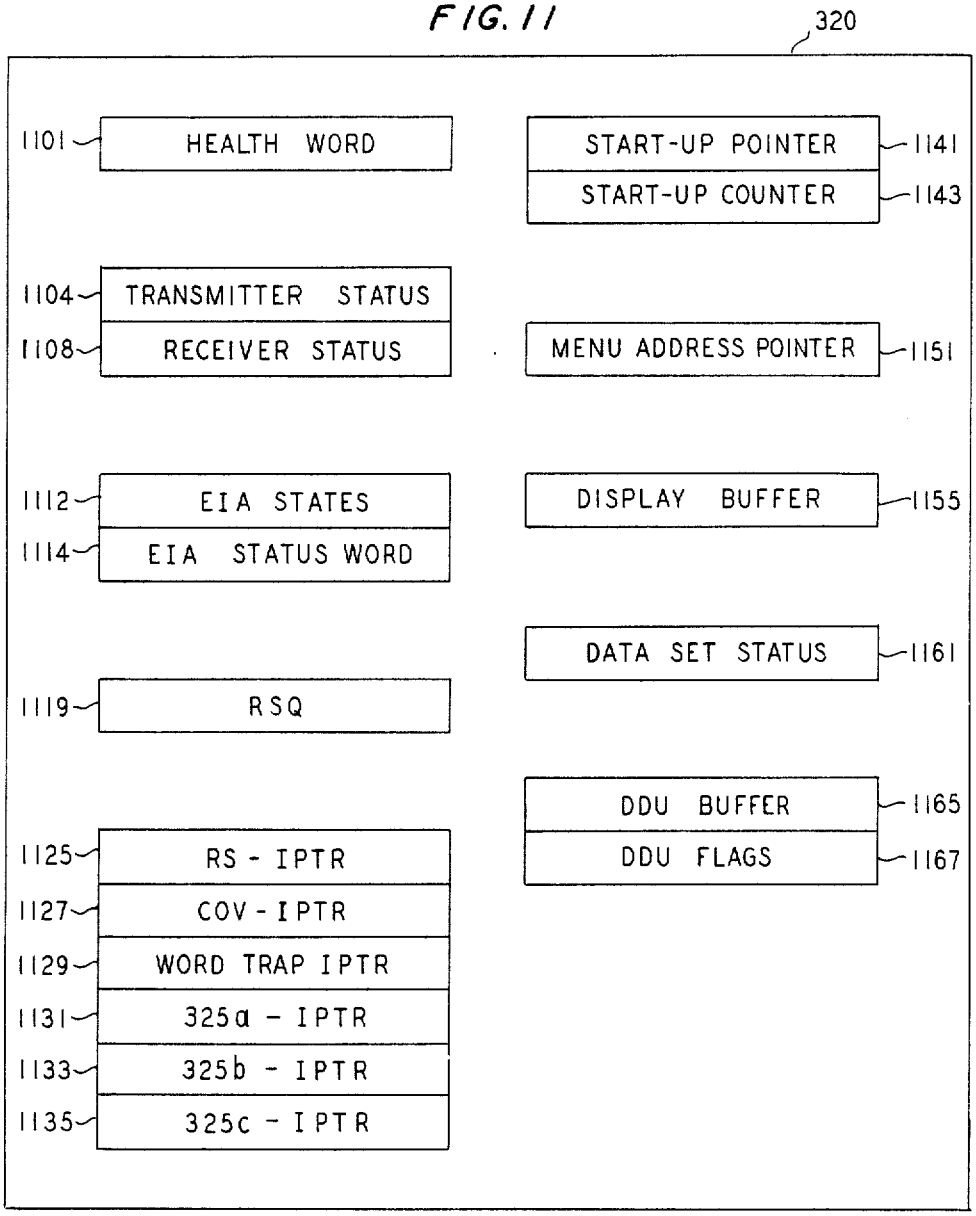
FIG. 11 depicts a portion of a random access memory within the data set controller.

Various random access memories are also loaded by initialization routines 963. These include random access memories within encoder 115 and decoder 175 which hold microcoded program instructions under the control of which the encoder and decoder operate. Also initialized are all of the numerous variables stored in RAM 320, a number of which, shown in FIG. 11, are discussed below.

When the initialization routines have all been executed, control transfers to task handler 961. This routine carries out the background loop, causing controller 30 to sequentially perform the above-mentioned background tasks. Each task is defined by a set of instructions indicating what the controller is to do in performing the task.

Task handler 961 operates in conjunction with a task table 1001 shown in FIG. 10. The status and count columns of the table are contained within RAM 320; the function column is contained within data file 964 of ROM 315. Each line entry in table 1001 represents a different task, and the task handler considers each task in turn. If the status of the task is "active", control is transferred to that location in ROM 315 where the task is stored, and the task is performed. (The symbol "&" used in FIG. 10 means "address of.") If the status of the task is "suspend," or "wait," the task is not performed; the task handler simply goes on to the next task. (A task may be placed in the "suspend" status, for example, if its execution would interfere with other data set operations. An example of placing a task in the "wait" status is given below.) When the last task in the table has been completed, task handler 961 returns to the first task and so forth.

As seen in FIG. 9 each ROM file category, except the utility category, includes one or more tasks. Typical tasks in each category will now be described.

The background diagnostic task 901, comprising the entire background diagnostic file, continually checks the integrity of the data set circuitry, in accordance with a feature of the invention. For example, various data patterns are read into and out of RAM 320 to ensure that data can, in fact, be accurately read in and out of the RAM. The voltage of a standby battery (not shown) for RAM 320 is checked. The sum of the contents of each of the chips comprising ROM 315 is formed and compared to a known value to ensure that the proper chips where inserted in the proper places during data set manufacture and to ensure that the ROM contents remain correct.

Another aspect of the background diagnostic task is to read an ID word stored in a particular register in each of the LSI circuits of circuitry 20. The value of each ID word, as read, is compared to the known value thereof stored in ROM 315. The ability of controller 30 to retrieve the proper ID word from each LSI circuit is a good indication that at least a considerable portion of the controller 30 bus structure is functioning properly. It is also one indication that the LSI circuits are themselves operational and that the proper LSI circuit was inserted in the proper place during data set manufacture.

The background diagnostic task also monitors the peak signal level of the modulator 120 output signal to assure that it is within operational limits. It also examines the value of $(\sin^2\theta+\cos^2\theta)$ ($\theta$ being the carrier angle), which is computed and held in receiver processing and equalization circuit 170. That value should always be equal to unity. Verification that it is, in fact, equal to unity is a good indication that circuit 170 is functioning properly. Upon the failure of any of these diagnostic checks, the background diagnostic task sets a flag in a data set health word 1101 stored in RAM 320, as shown in FIG. 11. Through the operation of other tasks, as described more fully hereinbelow, the finding of a fault and the resulting setting of an appropriate flag in health word 1101 causes front panel status indicators 82 to be switched to red on/green off and a mnemonic for the fault is presented on display 87.

The modem operational task 941 is principally comprised of a number of so-called consistency checks. For example, the state of the RS (request-to-send) lead, which can be read from encoder 115, is compared with a transmitter status word 1104 within RAM 320. The transmitter status word indicates whether the transmitter circuitry is, for example, off, on, in start-up, or in turn-off. If the RS lead and transmitter status word are inconsistent, the controller initiates a transmitter turn-on or turn-off in accordance with the RS lead signal. In similar fashion, a signal within receiver processing and equalization circuit 170 indicating the presence of received signal energy is compared to a receiver status word 1108 within RAM 320. Again, if there is an inconsistency, a turn-on or turn-off of the receiver circuitry is initiated. The modem operational task also performs a streaming check if the data set has been optioned for same. In accordance with this check, the time over which the RS lead remains high is monitored. If it exceeds a predetermined value, the task turns off the modulator and sets a flag in health word 1101, again resulting in an indication of the fault on front panel 701.

EIA tasks 931 involve the monitoring of various leads to which the data set is connected. One EIA task monitors the status of various leads of EIA interface connector 17, which it stores in an EIA states word 1112, and upon detecting transitions, takes appropriate action. For example, upon detecting via one of EIA buffers 105 that the LL (local loopback) or RL (remote loopback) lead has been raised by the user's terminal equipment, this EIA task invokes an appropriate one of EIA tests 932, which runs the test. Similarly, upon detecting via another one of buffers 105 that the SS (select standby) lead has been raised, this task causes relay SR to close. The resulting closure of relay contact SR indicates to back-up circuitry associated with the data set 10 that the latter is to be connected to a back-up transmission channel. The SB lead is also raised at this time, indicating that the back-up channel is in use.

In accordance with another EIA task, the states of various leads of interface 17 are sampled over successive five-second intervals. If all samples of a particular lead show that lead to have been off (on) throughout a given interval, an "off" ("on") state indication is stored for the lead. If it changes state during the interval, a "changing" status indication is stored. The ensemble of status indications, stored as a word 1114, is reported to DCD 75 in response to a request for same.

Tests and commands tasks 951 include, for example, so-called facility health monitoring. A typical facility health monitoring function is to monitor an RSQ (received signal quality) word 1119 which is generated within the data set and which reflects the average received signal constellation dispersion. If the RSQ word crosses a predetermined threshold, indicating a likelihood of a high data decision error rate, a facility failure flag within health word 1101 is set. Another facility health monitoring function is the monitoring of the received signal level. A determination that that level is too high or too low also sets a flag in health word 1101.

The communication control tasks relate to communications between the data set and the user, including, for example, the scanning of switches 85, activation of status indicators 82 and the control of display 87. Another communication control task is a so-called test manager which oversees the running of data set and network tests.

A more detailed discussion of operation of these tasks is included in the COMMANDS AND TESTS section below. A discussion of DDU handler task 921, via which controller 30 communicates with controller 50, is also included in the discussion.

Primary Controller Operation—Interrupts

As previously mentioned, execution of the background loop via task handler 961 continues indefinitely until controller 30 receives an interrupt. Within the controller, interrupts are received by microprocessor 310 via lead 331. In accordance with a feature of the invention interrupts originate from several places within circuitry 20 and are generated in response to various signal events within that circuitry. The previously mentioned request-to-send interrupt, for example, is generated by encoder 115 on lead 118 when the user's terminal equipment raises or lowers the RS lead. Receiver processing and equalization circuit 170 generates an energy detect (COV) interrupt on lead 173 when signal energy appears on, or disappears from, cable 166. Decoder 175 generates a word trap match interrupt on lead 177 when a particular received data word, such as a synchronization word, is determined to have been received.

In addition, interrupts are generated on leads 326 by respective ones of three timers 325a, 325b and 325c within timer circuitry 325. Each of these timers is programmed by microprocessor 310 to operate principally in one of two modes. In the so-called divide-by-N mode, the timer will generate an interrupt for every N pulses from a respective clock signal, where N is a number specified by the microprocessor over data bus PD. In a monostable mode, the timer provides a single interrupt after a predetermined number of clock pulses (again specified by the microprocessor) have occurred. Timers 325a and 325b are used principally in connection with transmitter and receiver operations, respectively. Timer 325c is a general purpose timer used, for example, in connection with tests and with the decrementing of the task table "wait" status count, as described below. Although not shown in the drawing, timers 325a, 325b and 325c respectively receive their clock signals from encoder lead LSC, one of decoder leaders 1918 and encoder lead NDR, which leads are discussed below.

When microprocessor 310 receives an interrupt from interrupt controller 330 over lead 331, control transfers from task handler 961 to a utility routine referred to as interrupt handler 962. The principal job of the latter is to determine the source of the interrupt by interrogating interrupt controller 330 and to then transfer control to an appropriate one of interrupt service routines 942 (a set of modem operational files) of interrupt service routines stored in other files of ROM 315.

Two or more interrupt service routines 942 are associated with some types of interrupts, such as the request-to-send and energy detect interrupts. For example, one request-to-send interrupt service routine is to be invoked when the data set is optioned for continuous carrier transmission, and a different one is to be invoked if the data set is optioned for switched carrier transmission. In accordance with a feature of the invention, the particular interrupt service routine to which control is to be transferred in response to a particular type of interrupt is determined in the background by, for example, the one of tests and commands tasks 951 referred to as the test manager (described below). The starting address of that routine is stored in an interrupt pointer—a particular location in RAM 320 associated with the type of interrupt in question. RAM 320 thus includes request-to-send, energy detect (COV) and word trap match interrupt pointers 1125, 1127 and 1129, respectively, and timers 325a, 325b and 325c interrupt pointers 1131, 1133 and 1135, respectively. Upon determining from interrupt controller 330 what type of interrupt was received, interrupt handler 962 reads the appropriate interrupt pointer and transfers control to the address stored therein.

By way of example, a detailed description of the operations performed by controller 30 in servicing a request-to-send interrupt will now be given.

The first operation of the routine is to determine from encoder 115 the state of the RS (request-to-send) lead. This is necessary because a request-to-send interrupt is generated both when the RS lead is raised by the user's terminal equipment and when it is dropped and different operations are to be performed, depending on which of these has occurred. For the present example, it is assumed that the RS lead has been raised, indicating that the terminal equipment has data which it wishes to transmit.

The request-to-send interrupt service routine then enters its first phase. In this phase, it first sets timer 325a to a divide-by-N mode such that interrupts will be generated by the timer every other symbol interval in alignment with the baud clock which is generated by encoder 115 and which is readable by controller 30 over the data bus. In addition, the starting address of the next phase of the routine, which is to be executed when 325a timer generates its next interrupt, is stored in timer 325a interrupt pointer 1131. In addition, the RS indicator on front panel 701 is turned on via the corresponding one of latches 81.

Further operations in the first phase include writing information into various registers within encoder 115 and modulator 120. This includes, for example, setting a bit in the modulator indicating that the modulator is to be on. In addition, information is written into encoder 115 to indicate that ideal reference (start-up) data (which is to be encoded and passed on to modulator 120 during start-up) will be being loaded into encoder 115 every other symbol interval, with ideal reference data for two symbol intervals being loaded each time. Indeed, ideal reference data for the first two start-up symbol intervals was already loaded into encoder 115 as part of the most recently executed transmitter turn-off routine. (Other information loaded into the encoder by the turn-off routine includes information relating to the differential encoding algorithm to be used during start-up, and a program counter word indicating the address within the encoder RAM of the program which defines the order of operations to be performed by the encoder during start-up).

Information is also loaded into encoder 115 which inhibits operation of the initial portion of the scrambler circuit—the so-called prescrambler. In addition, certain variables are set up in RAM 320. For example, transmitter status flags 1104 is set to indicate that the data set is, in fact, in transmitter start-up; a start-up pointer 1141 is set to the address in ROM 315 which holds the ideal reference data for the next two symbol intervals; a start-up counter 1143 is initialized to a count equal to the number of times the ideal reference data loading operation is to be performed. The routine then returns control to interrupt handler 962 which, in turn, transfers control back to the background loop.

The ideal reference data previously loaded into encoder 115 is encoded and transmitted by encoder 115 and modulator 120 during the next two symbol intervals. Timer 325a thereafter times out, thereby generating an interrupt and invoking interrupt handler 962. The latter reads interrupt pointer 1131 (since timer 325a was the source of the interrupt) and transfers control to the next phase of the interrupt service routine. At this time, the routine reads start-up pointer 1141; reads from the ROM location whose address is stored in the start-up pointer the ideal reference data for the next two symbol intervals; loads that data into encoder 115; increments start-up pointer 1141 so that it points to the next ideal reference word; decrements start-up counter 1143 and then examines the contents of the counter. Assuming that the start-up counter value is non-zero, the routine again returns control to interrupt handler 962 and thence to the background. Timer 325a generates an interrupt two symbol intervals later and the process repeats.

When the contents of start-up counter 1143 are found to be zero, timer 325a interrupt pointer 1131 is set to the address of the next phase of the routine and return is made to the interrupt handler only after the operation of timer 325a is modified to time a 12-baud interval. The structure of timer circuitry 325 is such that before timing the 12-baud interval, timer 325a will operate for one more cycle in accordance with its previous mode of operation. Thus, two symbol intervals later, timer 325a generates another interrupt, and control transfers to the next phase of the interrupt service routine. In this phase, information is loaded into encoder 115 indicating that scrambled marks must now be transmitted by clamping the SD (send data) lead low. In addition, the encoder program counter is now set to that portion of the encoder microcode defining the order of operations for normal, transmitter on, operation. Information indicating the type of differential encoding to be used during normal, as opposed to start-up, operation is also communicated to the encoder. Control is then returned to task handler 962 and thence to the background. In addition, timer interrupt pointer 1131 is set to the address of the last phase of the routine.

Twelve symbol intervals later, timer 325a generates its last interrupt, and control transfers to the last phase of the routine. At this time the SD lead is unclamped; the prescrambler is enabled; the CS (clear-to-send) lead is raised; the CS (clear-to-send) indicator 82 is turned on; transmitter status word 1104 is set to indicate "transmitter on"; and timer 325a is turned off.

The interrupt service routines associated with the energy detect and word trap match interrupts are similarly comprised of instructions which implement the appropriate data set operations for the interrupt in question. For example, an energy detect interrupt generated by circuit 170 upon the detection of energy on the signal lead within cable 166 initiates a receiver start-up via an interrupt service routine which is executed in phases in response to interrupts from timer 325b. In the initial phase, controller 30 configures circuit 170, for example, to use an initial timing recovery mode, AGC adaption step size and set of equalizer coefficient values. In addition, a bit is set in circuit 170 to indicate that ideal reference data (which is used in initial equalizer training) will be being jammed from controller 30. At this time, decoder 175 is configured to perform the inverse of the initial start-up operations of encoder 115.

As the receiver start-up continues, the interrupt service routine directs such functions as the actual jamming of ideal reference data, changing the AGC step size and enabling the carrier recovery circuit. At the end of the start-up, the RR (receiver ready) and SQ (signal quality) leads are raised. (The SQ lead follows the RR lead except that the former is low when the equalizer within circuit 170 is in a retrain mode.) At this time, in addition, the RR indicator on panel 701 is turned on and the RD (receive data) lead—which was previously clamped low—is unclamped.

The word trap match interrupt is used in the course of various, e.g., end-to-end, tests. The principal job of its associated interrupt service routine is to initiate the first phase of various routines which take advantage of the word trap capability of the data set.

Interrupts generated by timer 325c, for example, are used in connection with the "wait" status of tasks in task table 1001. In typical data set operation, this timer is operated in the divide-by-N mode. Its associated interrupt pointer 1135 is set to the address of an interrupt sevice routine which decrements the count associated with each task having the "wait" status. When a count is found to be zero, the interrupt service routine changes the status of the task to "active," so that the task is executed in the next pass through the task table. Part of the task may be to return its own status to "wait" and to reset the associated count to an initial value. In this way, the task is executed periodically, but not in every pass through the task table. The status reporting task described below is an example of this type of task.

PRIMARY CHANNEL CIRCUITRY—LSI CIRCUITS

General

As previously noted, each of the LSI circuits of circuitry 20—encoder 115, modulator 120, receiver processing and equalization circuit 170 (which is illustratively comprised of four separate LSI circuits) and decoder 175—is designed to operate in data sets employing different scrambling and differential encoding algorithms, bit and baud rates, modulation formats, carrier frequencies, etc. These circuits, moreover, can be used in data sets which operate over the switched telephone network or private line networks. The latter include both point-to-point and multipoint (polling) networks and both extended and nonextended networks. The encoder and decoder circuits, moreover, include arrangements which allow up to four 2400 bps data signals to be multiplexed at the transmitting end, transmitted at 9600 bps and demultiplexed at the receiving end.

Data set 10 operates on a point-to-point, nonextended private line on a nonmultiplexed basis. It uses 8-phase PSK. In order to simplify the ensuring description, circuitry within the LSI circuits which is not required to effect this mode of operation for data set 10, is not shown or described herein. Thus, circuitry relating to the following, for example, is not discussed: multiplexing and demultiplexing; multipoint polling; the generation of QAM constellations; elastic data storage (which is used in extended networks).

All three primary buses, address bus PA, control bus PC and data bus PD, as well as a respective lead from chip select cable PCS, extend to each LSI circuit (or in the case of circuitry 170 one of the LSI circuits therein). As shown in the FIGS. which depict the LSI circuits, bus PD extends directly to and from each of the LSI circuit registers with which controller 30 communicates. For purposes of drawing simplicity, the FIGS. do not show controller interface circuitry, to which buses PA and PC and the chip select lead extend in each LSI circuit interface. (The chip select extending to the encoder, modulator, receiver processing and equalization circuit, and decoder are designated CS1, CS2, CS3 and CS4, respectively.) This circuitry, however, is of conventional design. It responds to an enable signal on the chip select lead to operate the register whose address is then on bus PA. In particular, the controller interface circuitry causes information to be written into the register from bus PD when the write lead of control bus PC is enabled and causes information to be read from the register onto bus PD when the read lead of bus PC is enabled.

In a similar vein, it is to be noted that most of the LSI circuit registers which communicate with controller 30 are capable of holding eight bits of information. For the most part, the function of those bits which do not relate to the operation of data set 10, as configured, are, again, not discussed herein.

Encoder

Figure 13:
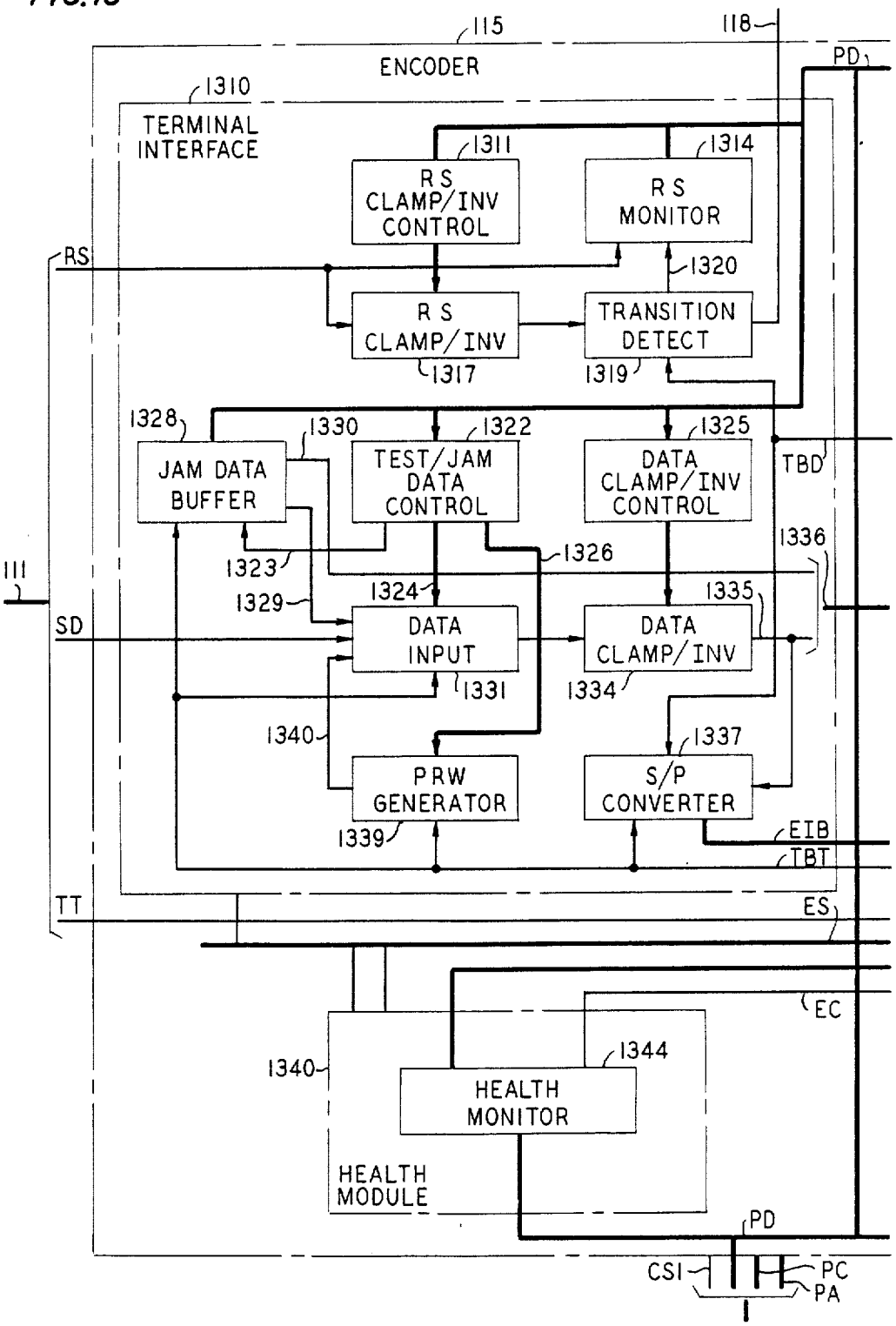
FIGS. 13–15, when arranged as shown in FIG. 16, show an encoder used in the data set.
Figure 14:
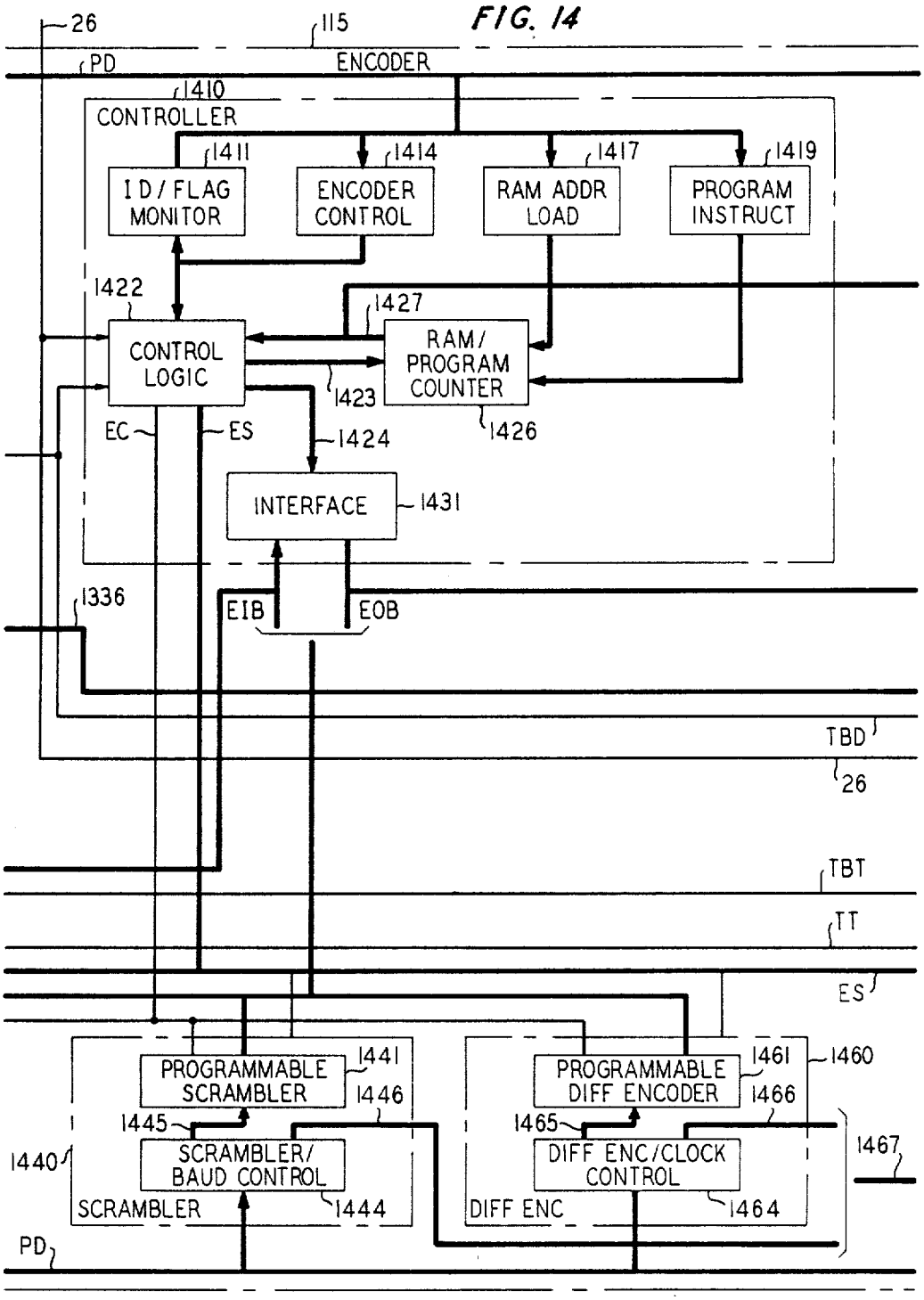
Figures 15, 16:
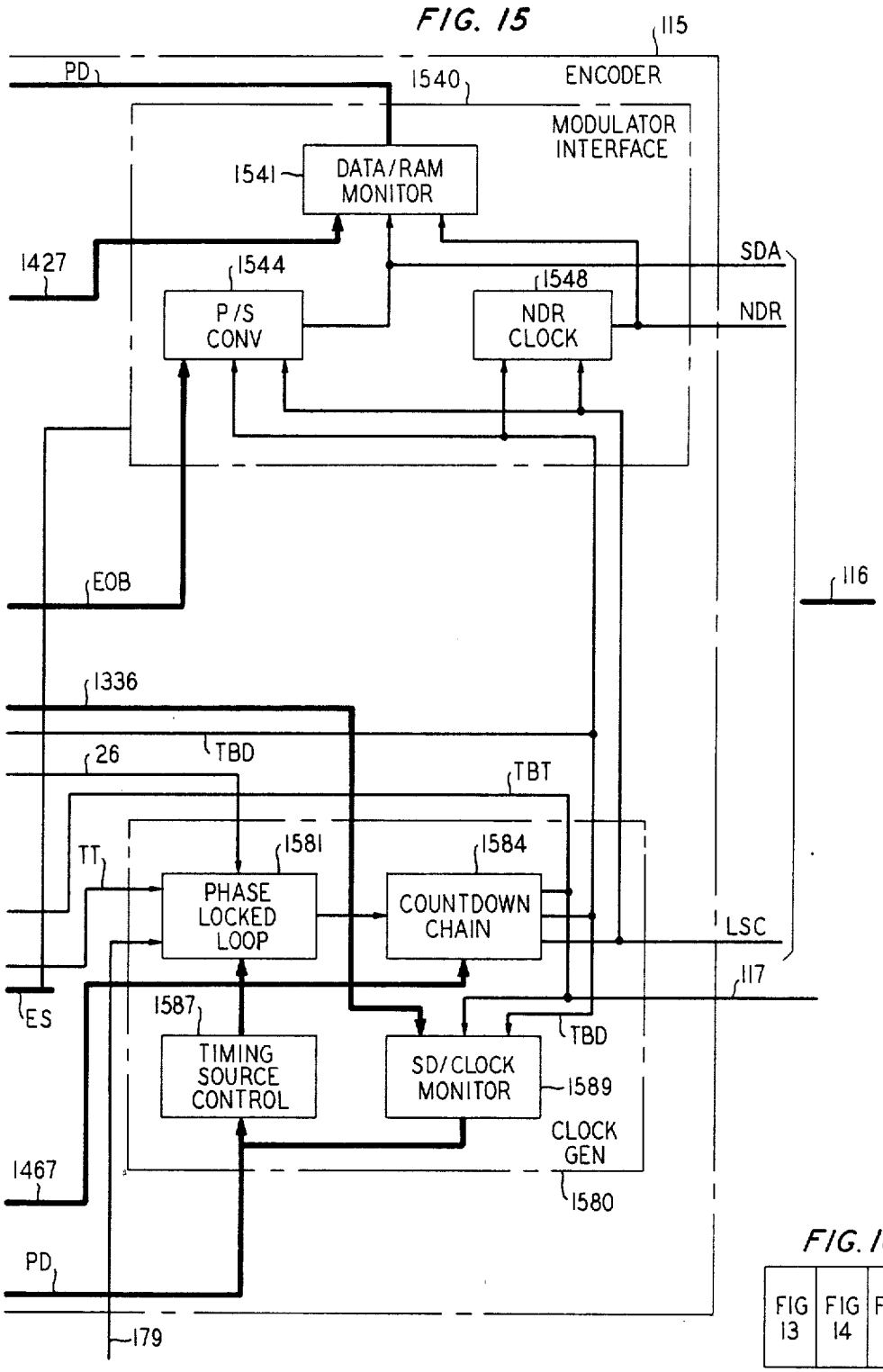

FIGS. 13–15, when arranged as shown in FIG. 16, depict encoder 115. This LSI circuit is comprised of a clock generator 1580 and five signal processing modules—terminal interface 1310, health module 1340, scrambler 1440, differential encoder 1460 and modulator interface 1540. The signal processing modules are controlled by a controller 1410.

Data from controller 1410 is carried to modules 1340, 1440, 1460 and 1540 via encoder outbound data bus EOB. Data is received from modules 1310, 1340, 1440 and 1460 via an encoder inbound data bus EIB. Individual select leads are extended from controller 1410 to each other module via encoder select cable ES, with two select leads going to health module 1340 and one to each of the others. In addition, controller 1410 provides clock signals to health module 1340, scrambler 1440 and differential encoder 1460 over encoder clock lead EC.

At the beginning of each transmitter baud interval, controller 1410 accesses, i.e., enables the select lead of, terminal interface 1310. The latter, in response, provides on bus EIB a four-bit word comprised of data bits provided either by the user or generated within the data set. (Since data set 10 transmits three bits per baud, only three of the four bits on the four-bit word will have been derived from the user, the fourth bit being a "don't-care" bit.) Controller 1410 thereafter accesses modules 1340, 1440 and 1460 in a predetermined sequence. As each module is accessed, it reads from bus EOB the four-bit word previously stored in controller 1410. The module processes that word in response to clock pulses on lead EC and returns the processed word to controller 1410 over bus EIB. When the desired processing has been completed, controller 1410 accesses modulator interface 1540, which reads in the processed four-bit word from bus EOB and extends it in serial form to modulator 120 over lead SDA—one of the leads of cable 116.

Controller 1410 includes RAM/program counter (hereinafter referred to as RAM) 1426, control logic 1422, interface 1431, and registers 1411, 1414, 1417 and 1419. During data set initialization, controller 30 sets a configure but in register 1414 indicating that controller 1410 is to be in a configure mode. This bit, as well as three other bits of register 1414, is extended to control logic 1422. The latter, which receives the clock signal from primary master clock 25 over lead 26, responds to the set state of the configure bit by extending a signal to RAM 1426 over a lead of cable 1423, indicating that the RAM is to load successive program instructions placed in register 1419 by controller 30 into the RAM location placed by controller 30 in register 1417. Both registers 1417 and 1419 are operated in an unbuffered mode at this time. That is, whenever information is loaded into them, it passes immediately to RAM 1426.

The instructions loaded into RAM 1426 represent a number of programs, each defining the order of operations to be performed within encoder 115 for different modes of encoder operation, e.g., transmitter start-up, normal data transmission, etc. Once the initialization of controller 1410 is complete, controller 30 clears the configure bit in register 1414 and writes into register 1417 the address of the first instruction of the program in RAM 1426 which governs encoder operation during transmitter start-up. This address is loaded into the program counter of RAM 1426.

When encoder 115 is to begin encoding, controller 30 sets an operating mode, run, bit within register 1414. The start of each baud interval is signaled to control logic 1422 via a 1600 Hz baud clock provided by clock generator 1580 over transmitter baud clock lead TBD. At the beginning of the next transmitter baud interval, control logic 1422 begins pulsing RAM 1426 over another lead of cable 1423, causing the program counter to increment, whereby successive instructions of the program being run are provided back to control logic 1422 over cable 1427. Each of these instructions includes two pieces of information—the module to be accessed and the number of clock pulses (from one to four) to be generated on lead EC. This information is decoded by the control logic, which enables the appropriate lead in select cable ES and generates the specified number of clocks on lead EC. Control logic 1422 also pulses interface 1431 over cable 1424 to control the flow of four-bit words from bus EIB and onto bus EOB.

The completion of the processing for a given baud interval is manifested to control logic 1422 via a so-called halt instruction in the program. Control logic 1422 responds thereto by (a) terminating the incrementing of the program counter and (b) signaling RAM 1426 to read into its program counter an operating mode signal in the form of an address in register 1417. That address is the address of the first instruction of the next program to be run. As long as the encoder is in a particular operational mode, e.g., transmitter start-up, that address will be the same as was loaded into the program counter at the start of the previous baud interval.

Except during initialization, register 1417 is operated as a double buffered register. This means that the register is comprised of two sections—an outside section and an inside section. Information from controller 30 is written into the outside section but controller 1410 operates in response to information in the inside section. This arrangement allows controller 30 to write the starting address of a new RAM program to be executed without disturbing the current operation of controller 1410 and without the controller having to keep track of where the encoder is in its processing cycle. When it is desired to effect a transfer of information from the outside section to the inside section of the register, controller 30 clears a previously-set register write bit stored in register 1414. This is responded to by control logic 1422 at the beginning of the next baud interval by extending a transfer pulse to register 1417 (via a lead not shown), effecting the transfer of whatever information is in the outside section of the register into the inside section thereof.

Other registers (identified hereinbelow) which controller 30 writes into are double buffered. These registers also receive the transfer pulse from control logic 1422.

The values of the four bits in register 1414 (one of which is described below) are extended not only to control logic 1422 but also to monitor register 1411 from which they can be read by controller 30 in order to verify that their values are correct. Register 1411 also holds the previously-described ID word for the encoder.

Terminal interface 1310 receives the request-to-send and send data signals from the RS and SD leads of EIA interface connector 17 via cable 109, selector 110 and cable 111. (Although the input leads to this module are not actually the RS and SD leads of the interface connector, they are labeled as such in FIG. 13 to help the reader follow the signal flow.)

The request-to-send signal is received by a clamp and invert circuit 1317 which, as a function of the states of two operating mode bits in double-buffered register 1311, clamps the request-to-send signal, inverts it, or passes it through unchanged. The output of circuit 1317 extends to transition detector 1319, an output of which is request-to-send interrupt lead 118. The state of the request-to-send signal is monitored by controller 30 via a bit in monitor register 1314. Another bit in that register is controlled by transition detector 1319 over lead 1320; that bit is set for one baud interval following a request-to-send transition and is thereafter cleared. To this end, detector 1319 receives the baud clock on lead TBD.

The send data signal is received by data input circuit 1331. This circuit also receives serial bit streams from pseudo-random word (PRW) generator 1339 over lead 1340 and from jam data buffer 1328 over lead 1329. The jam data buffer includes an 8-bit register and associated control circuitry.

The operation of circuit 1331, buffer 1328 and generator 1339 is controlled by information in doble-buffered register 1322. In particular, two operating mode bits in register 1322, provided on cable 1324, determine whether circuit 1331 will take as its input signal user-provided data from the SD lead, ideal reference or other data from buffer 1328 (loaded into the buffer from controller 30) or a pseudo-random word from generator 1339, the latter being used as part of certain tests. Another two bits from this register extend to generator 1339 via cable 1326. One of them indicates whether a 15- or 511-bit word is to be applied to circuit 1331. The other bit causes generator 1339 to inject a single bit error in the pseudo-random word (so that the error-detecting capability of the far end data set can be tested). Another bit of register 1322 extends to buffer 1328 via lead 1323. This bit is always in the set state in data set 10 and indicates to the buffer that it is to operate in a parallel-to-serial mode.

The output of circuit 1331 extends to data clamp/invert circuit 1334 which provides a similar function to circuit 1317 and which is controlled by two operating mode bits in double-buffered register 1325. The output of circuit 1334 is extended to serial/parallel (S/P) converter 1337 which provides the data in parallel form onto bus EIB when terminal interface 1310 is accessed. Circuits 1331 and 1337, buffer 1328 and generator 1339 all receive from clock generator 1580 a 4800 Hz bit clock via transmitter bit clock lead TBT.

Two signals from terminal interface 1310 are extended via cable 1336 to monitor register 1589 in clock generator 1580 where they can be monitored by controller 30. One of these is a signal from buffer 1328 on lead 1330 indicating when it is empty and thus able to accept new data. The other is a tap off of the output of circuit 1334 on lead 1335.

Health module 1340 is essentially comprised of a health monitor register 1344. The function of this module is to store four-bit words generated by the other modules in the course of the encoding process. Each four-bit half of register 1344 has its own select lead in cable ES. Thus each half can be accessed independently by controller 1410 to store a respective four-bit word. The words stored in register 1344 are examined by controller 30 to check that the encoder and its various elements are operating properly. If, for example, the two halves of register 1344 are respectively accessed by controller 1410 before and after scrambler 1440 is accessed, the two words stored in register 1344 will be the scrambler input and output. These can be compared by controller 30 to verify that the scrambler is operating properly.

Register 1344 is the only encoder register read by controller 30 which is double buffered. As long as a register read bit in register 1414 is set, there is no transfer of information from the inside section of register 1344 to its outside section. When the register read bit is cleared, however, this register, like the other double-buffered registers, receives a pulse from control logic 1422 (via a lead not shown) at the beginning of each baud interval to effect the transfer.

Scrambler module 1440 is comprised of a programmable scrambler circuit 1441 and double-buffered register 1444. Programmable scrambler circuit 1441 includes the circuitry necessary to implement a number of CCITT and Bell System scrambling algorithms. Four signal processing format bits from register 1444, extended to circuit 1441 over cable 1445, indicate which scrambling algorithm will be used and also provide scrambler clearing.

Differential encoder module 1460 is comprised of a programmable differential encoder circuit 1461 and a double-buffered register 1464. Programmable differential encoder circuit 1461 includes the circuitry necessary to implement a number of CCITT and Bell System differential encoding algorithms. Four signal processing bits from register 1464, extended to circuit 1461 over cable 1465, indicate which differential encoding algorithm will be used and also provide differential encoder clearing.

Modulator interface module 1540 includes parallel/serial (P/S) converter 1544, new data ready (NDR) clock 1548 and a monitor register 1541. In each baud interval, converter 1544 receives from controller 1410 on bus EOB a four-bit word representing the phase to be imparted to the transmitted carrier by modulator 120. At the start of the next baud interval, while terminal interface 1310 is providing to controller 1410 the next four-bit word to be encoded, modulator interface 1540 shifts the four bits theretofore loaded into it out to modulator 120 via lead SDA of cable 116. To effect this, converter 1544 receives the transmitter baud clock from lead TBD and a 9600 Hz line signal clock provided by clock generator 1580 on lead LSC. The latter also extends to modulator 120.

NDR clock 1548 receives the clocks on leads TBD and LSC. When all four bits have been shifted out to modulator 120 from converter 1544, NDR clock 1548 provides an indication of this to the modulator via a pulse on lead NDR of cable 116.

Taps off of leads SDA and NDR and cable 1427 (in controller 1410) are extended to monitor register 1541 for examination by controller 30.

Clock generator 1580 is comprised of a phase-locked loop 1581, countdown chain 1584, double-buffered register 1587 and monitor register 1589. Phase-locked loop 1581 provides to countdown chain 1584 a 28.8 kHz signal which, in normal data set operation, is either generated internally in response to the master clock signal on lead 26 or is phase locked to a user-provided 4800 Hz signal on the TT lead of interface connector 17. In loopback test modes, the output signal of phase locked loop 1581 is phase locked to the 1600 Hz baud clock generated by decoder 175 and extended to encoder 115 over lead 179. Three operating mode bits from register 1587 determine which of these timing sources will be used.

The baud and bit clock frequencies generated by countdown chain 1584 in response to the phase-locked loop output are determined by two operating parameter bits from register 1444, provided on cable 1446 within cable 1467, and four operating parameter bits from register 1464, provided on cable 1466 within cable 1467. (The reason so many bits are used relates to the fact that the countdown chain can be operated in numerous modes when encoder 115 is used in data sets which have multiplexing capability.) The 4800 Hz bit clock, in addition to being provided internally within the encoder over lead TBT, is also extended to the ST lead of interface converter 17 over lead 117, as previously described.

Register 1589, in addition to the aforementioned two signals received from terminal interface 1310 over cable 1336, receives taps off the baud and bit clock leads for monitoring by controller 30.

Decoder

Figure 17:
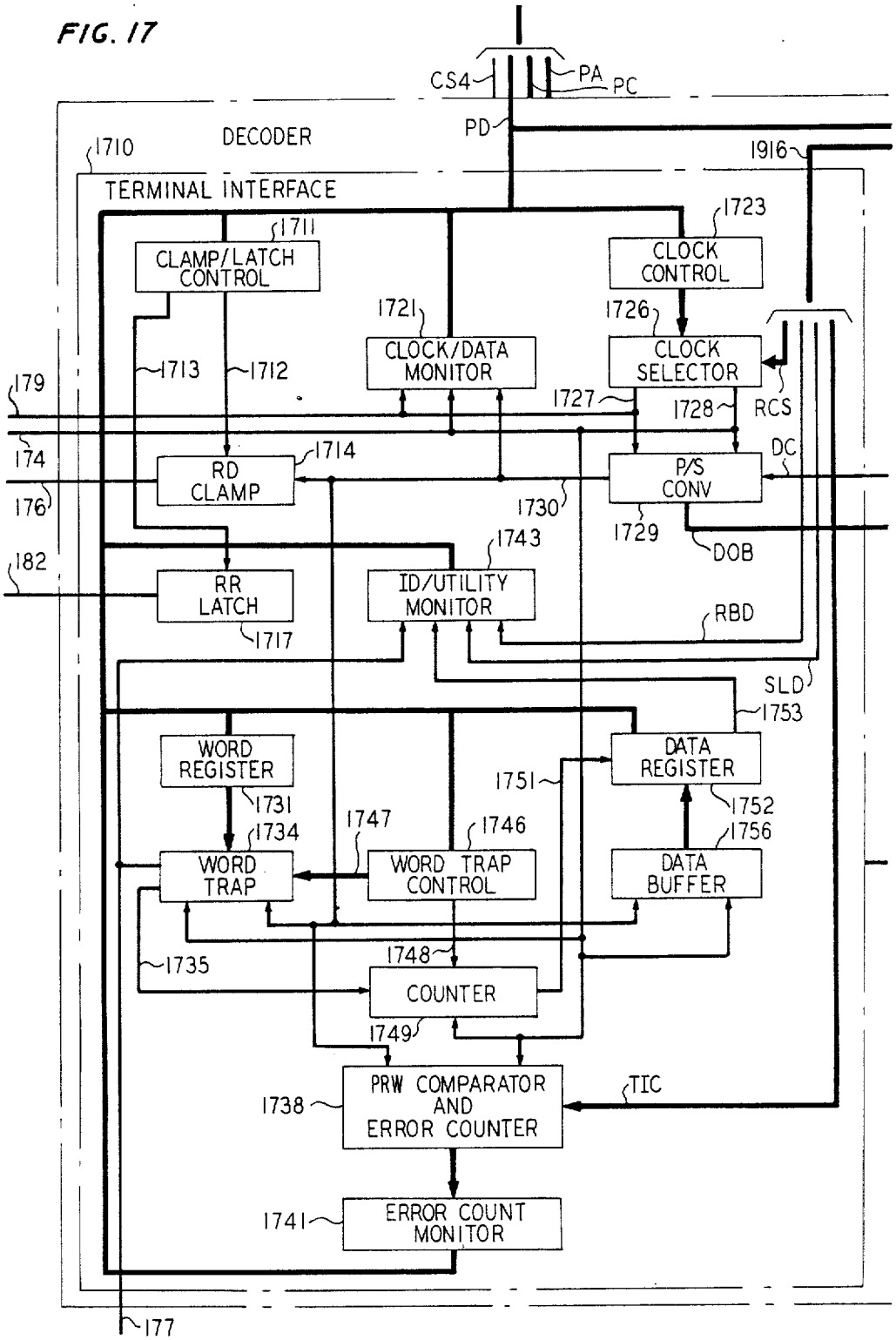
FIGS. 17–19, when arranged as shown in FIG. 20, show a decoder used in the data set.
Figure 18:
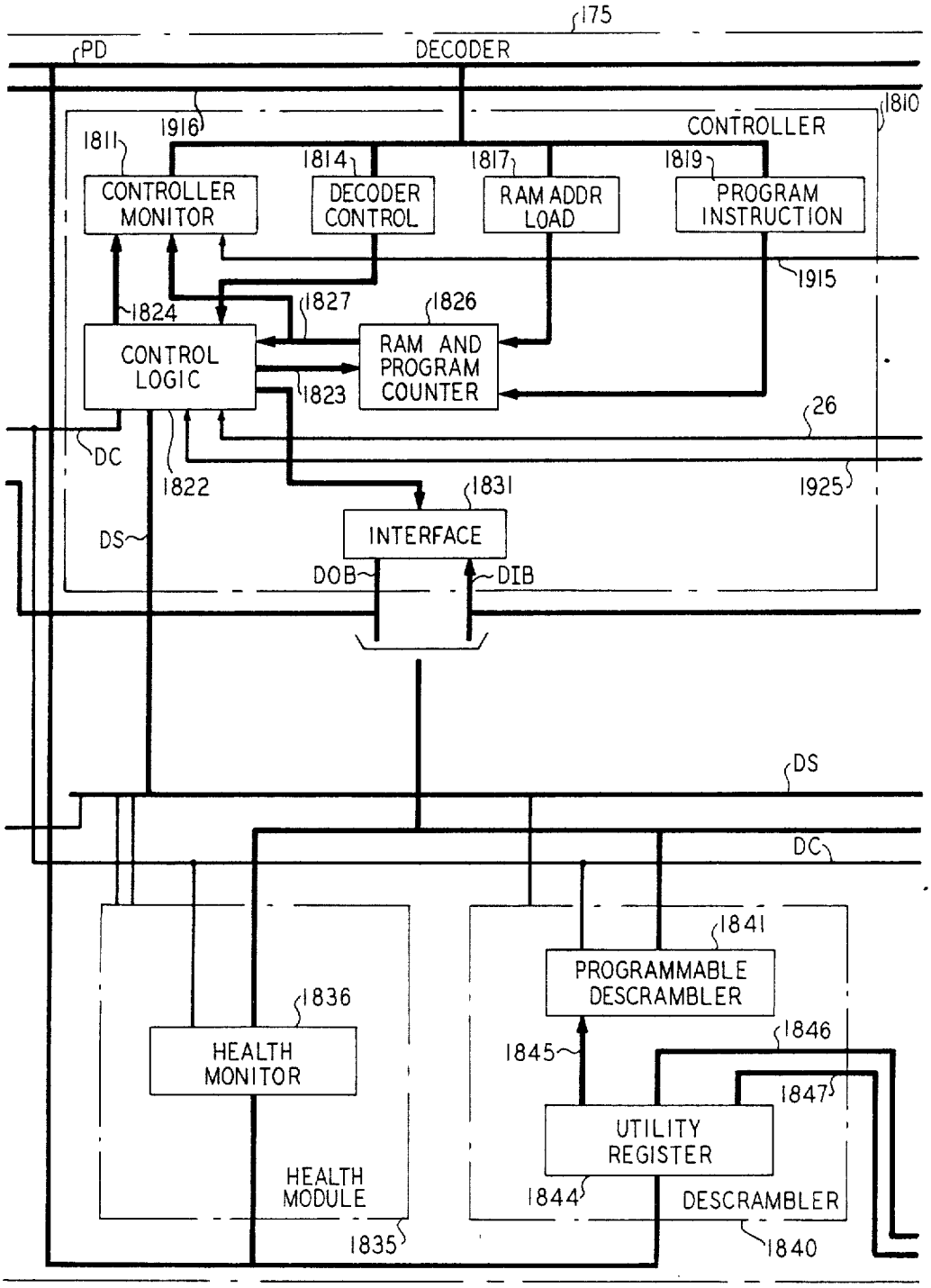
Figures 19, 20:
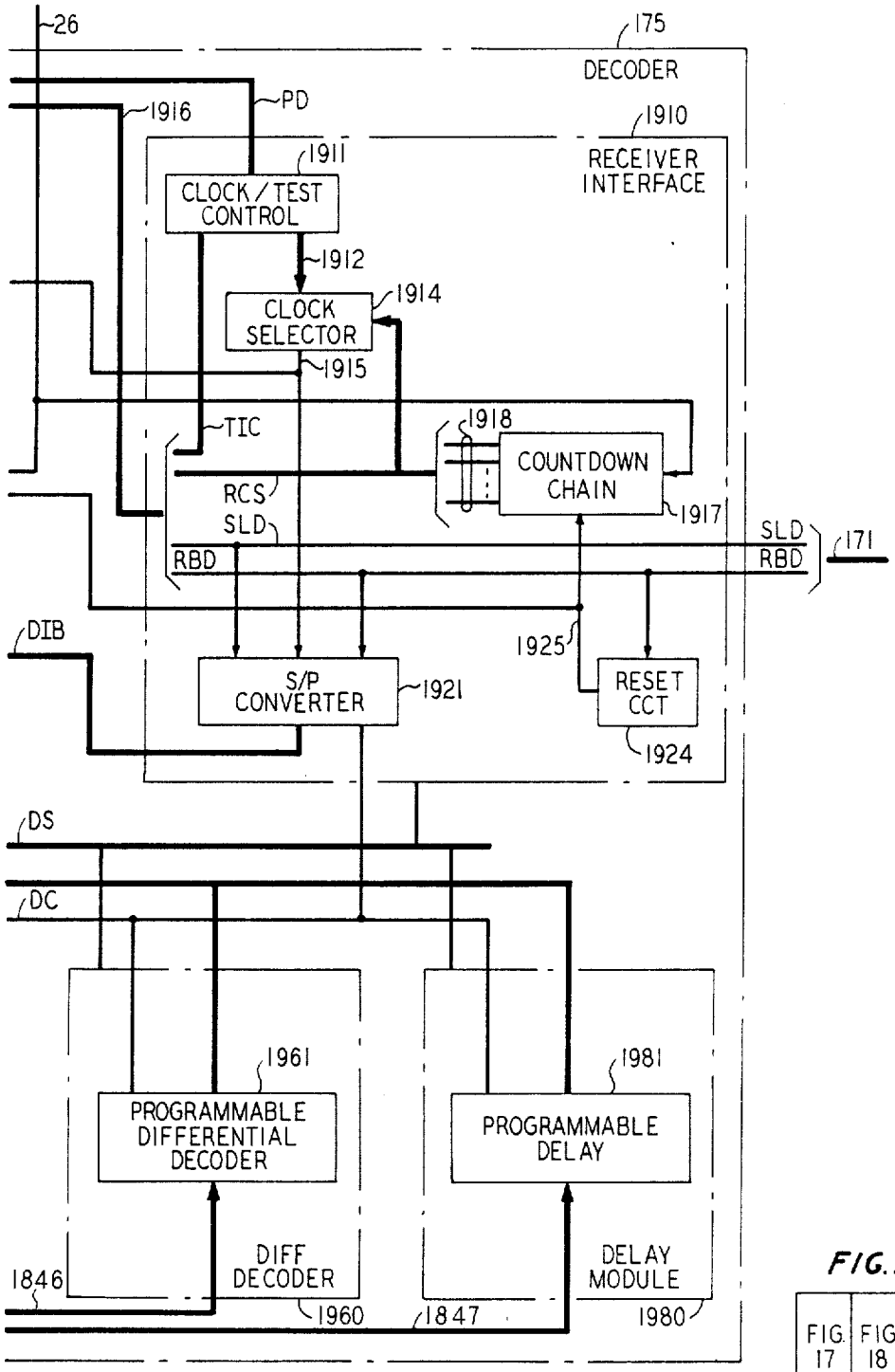

FIGS. 17–19, when arranged as shown in FIG. 20, depict decoder 175. The architecture of decoder 175 is similar to that of encoder 115. It includes, in particular, a controller 1810 which controls six signal processing modules—terminal interface 1710, health monitor 1840, descrambler 1840, receiver interface 1910, differential decoder 1960, and delay module 1980.

Controller 1810 is very similar to controller 1410 of encoder 115. It includes a RAM/program counter (hereinafter referred to as RAM) 1826, which operates in response to control logic 1822. The latter converts program instructions received from RAM 1826 into (a) select signals over decoder select cable DS and (b) clock signals on decoder clock lead DC. The signals on these leads cause each of the signal processing modules to operate on four-bit words provided from interface 1831 of controller 1810 onto decoder outgoing data bus DOB and to return the processed words to interface 1831 via decoder incoming data bus DIB.

Also similar to operations in controller 1410, program instructions are loaded into RAM 1826 from controller 30 via register 1819. RAM addresses, both for initial program instruction loading and subsequent program counter loading, are provided via register 1817. (The latter is operated in a double-buffered mode for program counter loading.) Configure, run, register read and register write bits are provided by controller 30 via register 1814.

Monitor register 1811 provides a different function from register 1411 of controller 1410. Via one of the bits of register 1811, controller 30 monitors the signal on lead 1915 of receiver interface 1910 used by the latter to clock in serial data from circuit 170. Two other bits for register 1811 are taken from control logic 1822 via cable 1824. One of those two bits indicates that controller 1810 has completed its processing for the current baud interval. The other bit taken from control logic 1822 monitors the signal with which the control logic initiates via a lead in cable 1823 each RAM instruction read. The five other bits of register 1811 monitor the RAM output on cable 1827.

Descrambler 1840 and differential decoder 1960 respectively provide the inverse functions of scrambler 1440 and differential encoder 1460 of encoder 115. Descrambler 1840 includes a programmable descrambler 1841, the operating mode of which is specified by controller 30 via three processing format bits from double-buffered register 1844 over cable 1845. The operating mode of a programmable differential decoder 1961 within differential decoder 1960 is controlled by two other processing format bits of register 1844, provided over cable 1846.

The other two, operating mode, bits of register 1844 extend via cable 1847 to a programmable delay 1981 within delay module 1980. In certain applications, a user's terminal equipment may not be able to tolerate the erroneous "data" bits which are generated during receiver turn-off. In such applications, module 1980 provides a delay in the bit stream provided to the user of either 15 or 21 bits (as determined from controller 30). When the RR (receiver ready) lead is dropped at the end of a transmission, the above-mentioned erroneous bits are still within module 1980 and thus are never extended to the user.

Health module 1835, which is principally comprised of double-buffered health monitor register 1836, operates in the same manner, and provides the same function, as health module 1340 of encoder 115.

Receiver interface 1910 is comprised of a clock selector 1914, countdown chain 1917, serial/parallel (S/P) converter 1921 and double-buffered register 1911. This module receives the signals extended to decoder 175 by receiver processing and equalization circuit 170 via cable 171. Cable 171, in particular, carries two signals; sliced data on lead SLD and the receiver baud clock on lead RBD.

Countdown chain 1917, operative in response to the master clock signal on lead 26, generates numerous clock signals on its output leads 1918, with the countdown chain being reset in response to a reset signal from reset circuit 1924 on lead 1925. The latter, in turn, generates the reset signal in response to the positive edge of the baud clock on lead RBD. (The reset signal also resets control logic 1822.) The signal on each of leads 1918 has a different frequency from 1200 to 9600 Hz. Various ones of these signals are used in different ones of the data sets which decoder 175 is designed to operate in. Leads 1918 extend to clock selector 1914 via cable RCS. Two operating parameter bits from register 1911 on cable 1912 indicate to selector 1914 which of the clock signals from the countdown chain is to be used as the bit clock for this particular data set. In the present example, as already noted, the bit rate is 4800 Hz.

The 4800 Hz signal is extended over lead 1915 to serial/parallel (S/P) converter 1921. This signal is used to clock in three bits per baud interval from lead SLD. At the beginning each baud interval, the bits shifted into converter 1921 during the previous baud interval are loaded in response to a clock pulse on lead DC into a register within S/P converter 1921 from which they are read by controller 1810 via bus DIB.

A cable 1916 carries a number of signals from receiver interface 1910 to terminal interface 1710. These include the signals on leads RBD and SLD and cable RCS. Also included in cable 1916 is a cable TIC, which carries signals from register 1911.

Terminal interface 1710 receives over bus DOB from controller 1810 fully-decoded data bits formatted in three-bit words, which are loaded into P/S converter 1729 in response to a clock signal on lead DC. Converter 1729 receives baud and bit clocks from cable RCS via clock selector 1726 and leads 1727 and 1728, respectively. The particular ones of the cable RCS signals to be applied to leads 1727 and 1728 are indicated to selector 1726 by controller 30 via operating parameter bits in double-buffered register 1723.

The serial output bits of parallel/serial converter 1729 are provided on lead 1730. From there, they extend to RD clamp 1714 which, depending on an operating mode bit in double-buffered register 1711 on lead 1712, either passes the data bits through to decoder output lead 176 or clamps that lead high. Another bit in register 1711, provided on lead 1713, controls RR (receiver ready) latch 1717, the output of which is decoder output lead 182.

The baud and bit clocks on leads 1727 and 1728, respectively, are provided on decoder output leads 179 and 174, respectively. These two signals, as well as the data bit stream itself, are also extended to monitor register 1721 for inspection by controller 30. The bit stream on lead 1730 and the bit clock on lead 1728 also extend to pseudo-random word (PRW) comparator and error counter (hereinafter referred to as PRW comparator) 1738, word trap 1734 and data buffer 1756.

More particularly, PRW comparator 1738 operates during various tests to (a) compare the received bits to a known pseudo-random word transmitted repetitively from the far end data set or (b) determine in a so-called data set self test whether the data stream is comprised of all bits in the set state. The number of transmission errors detected is counted within comparator 1738 and is provided to controller 30 via double-buffered monitor register 1741. Three bits from register 1911 (in receiver interface 1910) extend to PRW comparator 1738 via cable TIC—a portion of cable 1916. Two of these bits determine whether the received data stream will be examined for a 15-bit pseudo-random word, a 511-bit pseudo-random word or the stream of bits all in the set state. Another bit is used to clear the error counter within the element 1738.

Word trap 1734 generates the above-described word trap interrupt on lead 177 when a particular word loaded into register 1731 by controller 30 is detected in the bit stream on lead 1730. The word trap indication is held in a latch within the word trap, that latch being reset upon the writing of a new word into register 1731. Register 1731 is illustratively comprised of two eight-bit register so that a word of up to sixteen bits can be matched to. The actual number of bits from register 1731 to be used in performing the matching is indicated to word trap 1734 by controller 30 via three bits of register 1746 on cable 1747.

Counter 1749 and data buffer 1756 provide controller 30 with the ability to examine in parallel eight bits of the serial bit stream, with the bits being framed in response to the occurrence of a match signaled by word trap 1734. In operation, the lead 1730 bit stream is clocked serially into buffer 1756. The occurrence of a match, as signaled by a pulse on lead 1735, resets counter 1749. After eight bit clock pulses from lead 1728, counter 1749 pulses data register 1752 over lead 1751, causing it to load the eight bits then in buffer 1756 into register 1752. A bit from register 1746 on lead 1748, when set, inhibits counter 1749 from resetting in response to a word trap match. This prevents an erroneous resetting of the counter should a stream of bits in the received data happen to match the word in register 1731.

Four bits of monitor register 1743 provide the ID word for the decoder. Two other bits carry the signals on leads RBD and SLD. One other bit extends from word trap 1734 on lead 177. Another bit of register 1743, provided on lead 1753 by control circuitry associated with register 1752, is set when register 1752 is loaded with new data and cleared when that register is read.

Modulator

Figure 21:
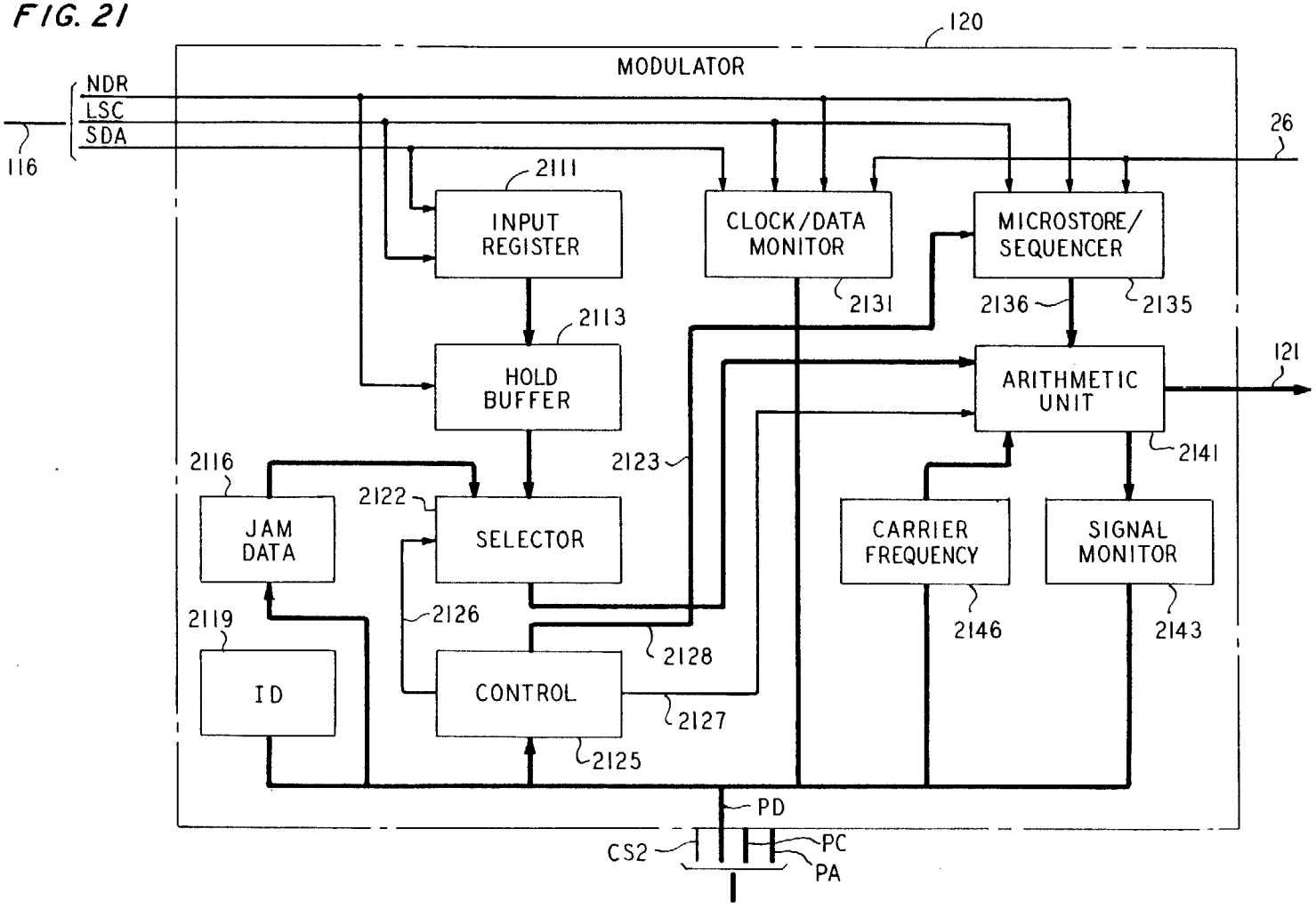
FIG. 21 shows a modulator used in the data set.
Figure 22:
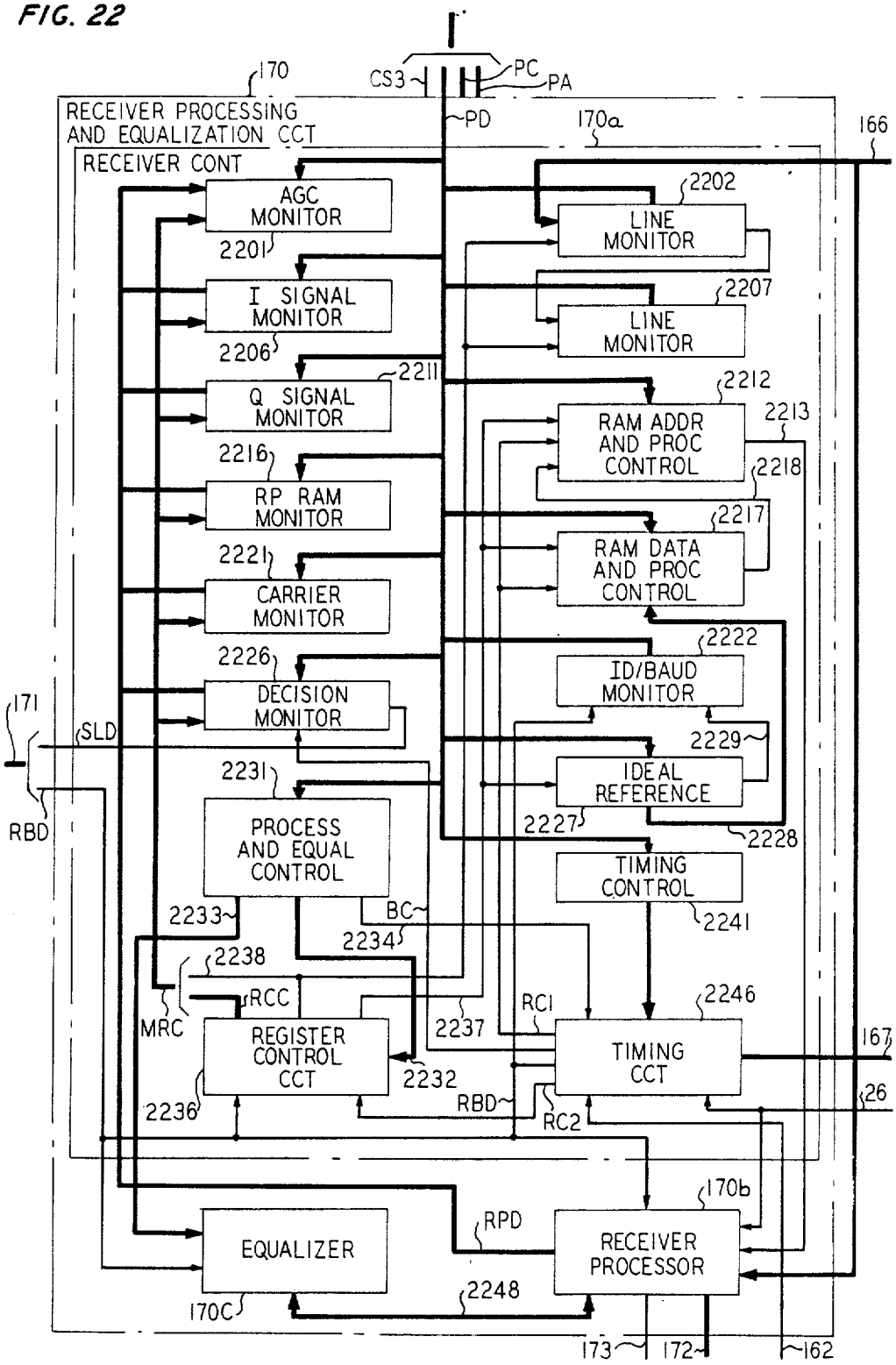
FIG. 22 shows a receiver processing and equalization circuit used in the data set.

Modulator 120, shown in FIG. 21, is principally comprised of a microstore/sequencer (hereinafter microstore) 2135, arithmetic unit 2141 and a number of registers.

Once per baud interval, a four-bit data word is shifted into an input register 2111 from encoder 115 over lead SDA of cable 116. As previously noted, each data word represents a carrier angle for the modulated data signal to be transmitted. The bits of the data word are clocked into register 2111 in response to the 9600 Hz line signal clock provided by encoder 115 on lead LSC of cable 116. The data is transferred in parallel form into a hold buffer 2113 in response to the signal on lead NDR. In normal operation, the output of buffer 2113 extends via selector 2122 and cable 2123 to arithmetic unit 2141. The latter provides the input to D/A converter 125 over cable 121.

Arithmetic unit 2141 contains circuitry such as adders, multipliers, multiplexers and random access and read-only memories. At any one time, the sequence of arithmetic operations performed by this circuitry in generating the modulated data signal is controlled by an appropriate one of four programs stored in microstore 2135 and extended to arithmetic unit 2141 over cable 2136. Three of the four programs define the order of arithmetic operations to be performed in providing respective ones of the three above-mentioned modulation formats. The fourth program defines the order of arithmetic operations needed to generate the tone sequences used to perform various tests. Microstore 2135 operates in response to the master clock signal on lead 26 and to the signals on leads LSC and NDR.

A 16-bit operating parameter word specifying the primary channel carrier frequency is provided to arithmetic unit 2141 by controller 30 via register 2146, which is illustratively comprised of two eight-bit registers. Controller 30 is also able to read these registers to verify that the correct carrier frequency value remains stored therein.

Register 2125 provides several functions. An operating mode bit therefrom extends to selector 2122 over lead 2126 to indicate whether the selector should take as its input signal the user-provided data words from hold buffer 2113 or jam data words provided from controller 30 via register 2116 during, for example, the generation of test tones. Another operating mode bit of register 2125 extends to arithmetic unit 2141 over lead 2127 and indicates whether the modulator is to be on or off.

Another four bits from register 2125 are extended to microstore 2135 over cable 2128. Three of them are processing format bits which identify which of the four programs stored in the microstore are to be used and, in the case of the test program, they also identify which of these read only memories within the arithmetic unit (which include baseband shaping information) are to be used. The fourth bit indicates whether the current line signal value or the current carrier angle is to be loaded into monitor register 2143 from arithmetic unit 2141.

Monitor register 2131 provides controller 30 with a way of monitoring the signals on leads 26, SDA, NDR and LSC. Register 2119 holds the modulator ID word.

Receiver Processing and Equalization Circuit

Receiver processing and equalization circuit 170 is comprised of a plurality of LSI circuits, one of which is receiver controller 170a and another of which is receiver processor 170b. A third element of circuit 170, equalizer 170c, is itself illustratively comprised of two LSI circuits.

The basic data signal flow through circuit 170 is as follows: The Hilbert transform signals generated by A/D converter are received one after the other on cable 166 along with a signal indicating that the analog-to-digital conversion is complete. Cable 166 extends to receiver processor 170b which, upon detecting line signal energy, provides the energy detect interrupt signal on lead 173. Receiver processor 170b thereafter operates in conjunction with equalizer 170c with which it communicates over two-way cable 2248, to equalize and demodulate the receive line signal and form data decisions therefrom. The data decisions are provided via receiver controller 170a to decoder 175 over lead SLD. Receiver processor 170b also provides to AGC 155 over cable 172 the above-mentioned digital word specifying the AGC gain and clock signals for the AGC.

Both receiver processor 170b and equalizer 170c can be realized in any of numerous ways which will be apparent to those skilled in the art. Moreover, neither receiver processor 170b nor equalizer 170c communicates directly with controller 30. Rather, all information transfer between controller 30,on the one hand, and receiver processor 170b and equalizer 170c, on the other hand, is effected via registers in receiver controller 170a. In view of those considerations, the description herein of the receive processor and equalizer is limited to their interaction with the receiver controller.

Receiver controller 170a is comprised of a timing circuit 2246, register control circuit 2236 and a plurality of registers which controller 30 either reads from or writes into over bus PD. Registers 2222, 2231 and 2241 are unbuffered. Each of the other registers is double buffered. (The concept of double buffering is described hereinabove in conjunction with encoder 115.)

Timing circuit 2246 receives as its inputs the baud-frequency square wave signal provided by phase splitter/timing recovery circuit 160 over lead 162. It also receives the master clock signal over lead 26. (The master clock signal also extends to receiver processor 170b. Equalizer 170c receives a different master clock signal (not shown) than the other LSI circuits.) The operation of timing circuit 2246 is controlled by two operating parameter bits from register 2241, which specify the bit rate for data set 10. Another, operating mode, bit from register 2241 determines whether the timing recovery circuitry within the circuit 2246 is to operate or be inhibited, e.g., during receiver start-up.

The outputs of timing circuit 2246 include a receiver baud clock on lead RBD. This signal extends to receiver processor 170b; equalizer 170c; decoder 175 via cable 171; monitor register 2222; and register control circuit 2236. The baud clock is monitored by controller 30 via a bit in register 2222.

Timing circuit 2246 also generates a 307 kHz clock and a clock having a frequency of twice the baud frequency, both of which are extended to A/D converter 165 over cable 167. The other outputs of timing circuit 2226 are discussed hereinbelow.

The registers into which controller 30 writes includes registers 2212, 2217, 2227, 2231 and 2241 (the latter having already been discussed).

During data set initialization, controller 30 uses registers 2212 and 2217 to load into a RAM within receiver processor 170b operating parameters relating to such items as carrier frequency, ideal decision points, etc. In particular, the information itself is loaded into register 2217 and the associated RAM address is loaded into register 2212. The bits in registers 2212 and 2217 are serially shifted to receiver processor 170b via lead 2213, with the bits from register 2217 passing through register 2212 via lead 2218. The shifting of these bits is controlled by a clock signal provided by timing circuit 2246 on a lead RC1. This process continues until the receiver processor RAM has been fully loaded. Control bits in each of register 2212 and 2217 indicate to receiver processor 170b that the information in the registers is, in fact, RAM information.

While receiver processing is ongoing, the control bits in register 2212 and 2217 indicate that the information in the registers is not RAM information but, rather, control information for the receiver processor. This control information includes, for example, two operating parameter bits in register 2217 indicating the adaptation step size to be used in updating equalizer coefficients. Another, operating mode, bit indicates whether the equalizer is to operate in normal or retrain modes. Three operating parameter bits determine the step size to be used in updating the AGC gain. Two operating parameter bits are comprised of ideal reference data from register 2227, as described below. The control information in register 2212 includes two bits indicating whether the equalizer should be operated in normal or start-up modes. Another two bits comprise a mode control signal, defining whether the receiver processor should operate in a normal mode, test mode, start-up mode (with decision-directed equalizer coefficient updating) or ideal reference mode (in which equalizer coefficient updating is performed in response to ideal reference data). Another operating mode bit determines whether the equalizer should be bypassed altogether and another defines which of two algorithms are to be used in updating the AGC gain. The shifting of the information from registers 2212 and 2217 into the receiver processor during received signal processing is effected once per baud interval.

Register 2227 receives ideal reference data for four symbols at a time (two bits per symbol) from controller 30. When circuit 170 is in an ideal reference start-up mode, control circuitry (not shown) operates register 2227 to cause the ideal reference data stored therein to shift two bits over. As each successive two bits reach the end of register 2227, they are loaded over cable 2228 into two bit positions of register 2217. The ideal reference bits thus loaded into register 2217 are thereafter shifted into receiver processor 1706 as previously described. A signal is provided from register 2227 on lead 2229 indicating when register 2227 is ready to receive new ideal reference data. This signal is provided to controller 30 via a bit of monitor register 2222 (which also provides the circuit 170 ID word).

Register 2231 provides three operating mode bits to equalizer 170c over cable 2233. Two of these bits define a control signal for the equalizer coefficients indicating, in particular, whether the equalizer should update the coefficients normally; inhibit coefficient updating; set the center tap equal to unity and all other coefficients to zero; or set all the coefficients equal to zero. The third bit enables and equalizer tap rotation control circuitry. Another operating mode bit from register 2231 extends to timing circuit 2246 over lead 2234 and, when set, indicates that the timing recovery circuitry therein is to continue to run even if carrier has apparently been lost. This capability is used to bridge apparent carrier losses.

Two other bits in register 2231 comprise register write and register read bits, respectively, for the double-buffered registers of receiver controller 170a. These bits extend to register control circuit 2236 over cable 2232. Upon receiving a baud clock pulse over lead RBD, circuit 2236 generates a transfer pulse on lead 2237 if the register write bit is set. Lead 2237 extends to each of the double-buffered registers into which controller 30 writes, and the transfer pulse thereon effects a transfer of information from the outside to the inside portion of each of these registers. Circuit 2236 similarly extends a transfer pulse to each double-buffered monitor register over lead 2238 and monitor register cable MRC.

The registers of receiver controller 170a not yet described are all monitor registers. In particular, the Hilbert transform components from cable 166, in addition to being applied to receiver processor 170b, are read into monitor registers 2202 and 2207 for inspection by controller 30. The remaining monitor registers receive their inputs from receiver processor 170b. Register 2201 holds the AGC gain value. Registers 2206 and 2211 hold the so-called in-phase (I) and quadrature-phase (Q) unsliced demodulated line signal values. Depending on whether the above-mentioned receiver processor mode control bits in register 2212 indicate normal or test mode, (a) register 2216 contains the eight bits stored in the receiver processor RAM at the location specified by controller 30 in register 2212 or it contains a word representing the line signal power and (b) register 2221 contains the present carrier phase angle or it contains the value $(\sin^2\theta+\cos^2\theta)$, where $\theta$ is that angle. Three bits of register 2226 hold sliced data decisisons and one bit indicates that carrier has been detected.

The bits to be loaded into these monitors registers from receiver processor 170b are provided by the latter serially on a lead within receiver processor data cable RPD, accompanied by a clock signal on another lead within that cable. Register control circuit 2236, responsive to the baud clock on lead RBD and a clock from timing circuit 2246 on lead RC2, pulses each of these monitor registers over a respective lead of a register control cable RCC—which is contained within cable MRC. As each register is pulsed, it is enabled to take in the next eight bits appearing on the data lead within cable RPD.

Register 2226 also receives a bit clock from timing circuit 2246 over lead BC. This clock is used to serially shift out to decoder 175 over lead SLD the three bit sliced data decision stored in the register.

SECONDARY CHANNEL CIRCUITRY

As previously indicated, the secondary channel circuitry—also referred to as the Data set Diagnostic Unit (DDU)—is controlled by a controller 50. Controller 50 is structured similarly to controller 30. It includes a microprocessor 510, ROM 515, RAM 520, timer circuitry 525, interrupt controller 530 and chip select decoder 535. Controller 50 communicates with its peripherals and the rest of the DDU—secondary signal processing circuitry 40, diagnostic channel circuitry 70 and secondary I/O circuitry 90—via secondary address bus SA, control bus SC, data bus SD and chip select cable SCS. The latter is comprised of the output leads 536 of decoder 535.

Secondary signal processing circuitry 40, as previously noted, receives the output of preamplifier 16. Within circuitry 40, the signal is received by secondary channel filter 405 which removes the primary channel receive signal and passes the FSK secondary channel receive signal to receiver 410. The latter provides an output pulse on lead 411 in response to each zero crossing of the FSK signal. These zero crossing indications are extended to microprocessor 510 via interrupt controller 530 and interrupt lead 531. The microprocessor through an algorithm which includes measuring of the time intervals between successive zero crossing interrupts. It does this with the aid of timer 525b, from which a count is read on bus SD. (Also operating in a divide-by-N mode is timer 525c, the interrupts of which define a 110 baud clock for the secondary channel.)

Secondary channel transmitter 415 receives from controller 50 information to be transmitted over the secondary channel. Transmitter 415 is illustratively an FSK transmitter which implements the inventions disclosed in U.S. Pat. Nos. 4,170,764 issued Oct. 9, 1979, to J. Salz et al and 3,801,807 issued Apr. 2, 1974 to J. Condon. The output of transmitter 415 passes to adder 15 via lead 416. Signals from which the frequencies of the two FSK tones are derived are provided to transmitter 415 from timer 525a via one of leads 526.

Secondary I/O circuit 90 includes a pair of latches 91, one-shot 93 and LED 94. The outputs of latches 91 extend to transmitter 415 over cable 92. One of these latch outputs turn transmitter 415 on and off. The other latch output determines which of two predetermined amplitudes the tone currently being transmitted by transmitter 415 is to have; as described in the Salz et al patent, the higher frequency tone has a smaller amplitude than the lower frequency tone. One-shot 93 is pulsed periodically (e.g., at 10 Hz) by controller 50 whenever a message is being transmitted or received on the secondary (diagnostic) channel. This causes a blinking of diagnostic channel indicator 94 on front panel 701.

Tests and commands can be initiated by the user not only from the front panel, as described below, but via diagnostic control device (DCD) 75 which is physically distinct from the data set. The DCD communicates with controller 50 asynchronously via diagnostic channel circuitry 70. The latter includes a DCD interface 71 and universal asynchronous receiver and transmitter (UART) 72 which formats and de-formats the asynchronous data. A clock for UART 72 is provided from timer 525f. Timers 525d and 525e are used for general purpose interrupt timing.

Communication between controllers 30 and 50 via bus interface 60 are carried out a character at a time. Bus interface 60 is illustratively a commercially available circuit known as a parallel peripheral interface. When controller 50 writes a character into the interface, it sets a flag within the interface. This flag is read over lead 61 and one of buffers 84 by a function which is called within controller 30 between each task table task. If the flag has been set, the character stored by controller 50 is read by controller 30 and stored in DDU buffer 1165. The reading of the character automatically resets the flag. Controller 50 periodically monitors the flag and if it has more characters to pass to controller 30, it loads it into interface 60 once the flag has been reset. DDU handler task 921, when executed, reads the contents of buffer 1165 and, if it finds a complete message, acts upon it, as described in further detail below.

Information is passed from controller 30 to controller 50 in a similar fashion.

The secondary channel circuitry, or DDU, performs three basic functions—DDU background diagnostics, network health monitoring and message routing. The DDU background diagnostics include various checks of the circuitry within the DDU to ascertain that it is operating properly. These checks are similar to ones performed on the primary side of the data set. Network health monitoring includes the polling of the downstream network (comprised, in this example, of a single data set) to obtain information as to how it is functioning—its so-called "health." It also includes the receipt of health information from the primary channel circuitry. All of this health information is held in RAM 520 and is provided to the primary channel circuitry and DCD 75 for display to the user.

The message routing function of the DDU provides for the orderly flow of messages among the primary channel circuitry (via interface 60), the network (via circuitry 40) and the DCD (via circuitry 70). The messages include such information as data set health, as mentioned above, the setting up and aborting of tests requested from front panel 701 or DCD 75 and the reporting of test results back to the front panel or DCD.

COMMANDS AND TESTS

This portion of the detailed description sets forth an example of how the data set provides the user with the ability, via front panel 701, to (a) change options under which the data set operates and (b) request the running of a test between the two data sets. This description illustrates the operational interrelationship of various tasks and also illustrates controller 30/controller 50 communication.

Suppose the user wishes to change a data set option, such as changing its operation from continuous carrier to switched carrier. This option change is effected by issuing a "change option" command to the data set, a procedure which is initiated by selecting the CMD (command) position of TEST/CMD rocker switch 85 on the front panel. The positions of all of switches 85 are read in each pass through task table 1001 by one of communications control tasks 911 referred to as the scan task. Upon determining that this is a new position for the TEST/CMD switch, the scan task initializes a menu address pointer 1151 within RAM 320 to the address of the first line entry of a test/command menu. The latter is a table 1201, shown in FIG. 12, stored within data files 964 of ROM 315.

The scan task examines a particular bit position within the multi-bit flag associated with the first entry of table 1201. This bit indicates whether the entry relates to a test or command. The first entry illustratively relates to a test. Upon determining this, the scan task advances the menu address pointer to the address of the next line entry, and so forth, until a command is encountered. Other bits within the flag are then examined to determine the data set configuration for which the command is valid. For example, certain commands, including the change options command, are valid only if the data set is in a so-called maintenance mode. (Data set 10 is presumed in this example to have already been placed in the maintenance mode via execution of a maintenance mode command (mnemonic MTNC). Other commands are valid for a control data set but not a tributary, etc. A data set status word 1161 in RAM 320 indicates the current configuration of data set 10 and this word is used to determine whether the command under consideration is valid.

Assuming that the command is valid, the scan task reads a mnemonic for the command—illustratively MDCK—(modem check)—from the mnemonic column of table 1201 and loads it into a display buffer 1155 within RAM 320. The scan task then calls a function which controls display 87. The latter, in turn, reads the display buffer contents and presents the mnemonic on display 87. Since the user does not wish to execute the modem check command, he or she will now push and hold the BWD/FWD (backward/forward) momentary contact rocker switch 85 to the FWD position. As long as the BWD/FWD switch is depressed, the scan task periodically scrolls through the command menu by advancing menu address pointer 1151 approximately once per second to the line entry of the next valid command and causes its mnemonic to be displayed, and so forth. (Reverse scrolling is achieved by depressing the BWD/FWD switch to the BWD side.)

When the mnemonic for the change options command—CHOP—appears, the user releases the BWD/FWD switch and pushes the EXECUTE switch. The scan task now examines the flag associated with this line entry to determine whether the +/− switch must be operated before the command can be executed. In this case, the +/− switch is used to identify the option to be changed. Accordingly, the scan task now causes CH to be displayed by writing that character string into display buffer 1155. The  tells the user that the +/− switch is to be depressed. Associated with each option is a two-character alphanumeric, e.g., A1, B3, C4. As the +/− is held depressed (to one side or the other) the scan task causes to be sequentially displayed (in forward or reverse order) the option alphanumerics for this type of data set, which are read from a table in ROM 315. If the option is currently installed, as determined from a table in RAM 320, it also displays a check mark, e.g., √B3.

If the user now pushes the EXECUTE button again, the displayed option, if not installed, will be installed and vice versa. In particular, the scan task sets a flag in RAM 320 indicating that a command waits to be executed and also indicating the source of the command (front panel or DDU). This flag is read in the background by one of tests and commands tasks 951 referred to as the test manager.

The test manager looks at the current value of menu address pointer 1151 and finds in the front panel function column (since the command issued from there), the address within tests and command filed 952 of the function which will effect the option change. The test manager transfers control to that function and the latter changes the option. As another example, suppose that the user wishes to run a transmit loss test which involves a measurement by the far-end modem of the receive level of a tone—illustratively at 1004 Hz—transmitted from data set 10 over the primary channel of transmit line 11. Tests are initiated by depressing the TEST side of the TEST/CMD switch, Now, as the BWD/FWD switch is depressed, only mnemonics for tests are displayed. The BWD/FWD switch is released by the user when the mnemonic for the test of interest—in this case, TRAN—appears on the display. (As with the change options command, the data set must have been already placed in the maintenance mode for this test.) Pushing the EXECUTE switch causes TR to appear on display 87**, indicating that the +/− switch is to be depressed until the two digit address of the far end data set that is to make the transmit loss measurement appears on the display. (In this example, of course, there is only one far-end data set.)

As before, the scan task, in response to a second pushing of the EXECUTE switch, sets a flag for the test manager. The latter responds by looking up the address of the appropriate function in table 1201 and transfers control thereto.

Before proceeding with a discussion of the set-up of the transmit loss test, it is useful to describe briefly the protocol which governs communication between the controllers 30 and 50. Controller 30 is always in a responsive mode with respect to controller 50. That is, the latter always initiates the communication. Controller 50 does this by periodically transmitting (via interface 60) an inquiry message to controller 30 which is stored in DDU buffer 1165.

DDU handler task 921, when executed, reads the inquiry and, if it has nothing else to respond with, responds with a message indicating the health of the primary channel circuitry, as read from health word 1101. If there are no faults to report, this fact is reported to controller 50. If there are faults, these are reported. This health information is stored by controller 50 in RAM 520 along with health reports received from the far end data set.

DDU handler task 921 also monitors one of DDU flags 1167 which is set periodically by one of communication control tasks 911—referred to as the status reporting task. This flag indicates that the status reporting task wishes to receive the health information compiled by controller 50. If the DDU handler tasks finds that this flag has been set, it responds to the inquiry from controller 50 not with an indication of primary channel circuitry health, but with a word which asks if controller 50 is free to accept a message. Controller 50 responds negatively if, for example, a test is in progress and it is waiting for results to be reported back from the far end data set. If, however, controller 50 responds positively, the DDU handler task transmits the message requested by the status reporting task, viz., a request for a network health report.

The requested information is thereupon written into interface 60 by controller 50 and is read by the DDU handler. The latter, in turn, stores the network health information in RAM 320 which it is read by the status reporting task. If a fault has been reported, the status reporting task switches status indicators 82 to red/on, green/off and loads into display buffer 1155 appropriate mnemonics for the faults detected.

Like the status reporting task, the test manager raises one of DDU flags 1167 when it wants to run a test which involves the DDU. In the case of the transmission loss test currently under discussion, use of the DDU is required since the far end data set must be prepared to receive the tone, measure the received signal level and report back the results.

Once the DDU handler receives an OK from controller 50 to transmit a message, it puts into interface 60 a message for the far end data set which instructs that data set to prepare for a test by entering a so-called test mode. Controller 50 upon examining the message, determines that it is not directed to it, but rather, is to be transmitted out over the secondary channel. It accordingly transmits the message.

When a confirmation is received from the far end data set that it is prepared to run a test, controller 50 passes this information to controller 30 which thereupon instructs the far end data set to prepare for the transmit loss test. Upon receiving a confirmation that this instruction was received, controller 30 causes modulator 120 to transmit the 1004 Hz tone over the primary channel at 0 dbm for 5 seconds. Controller 50 continually polls the far end data set for test results. Upon receipt of the test results—a measurement of received signal level in dbm—controller 50 passes them along to the DDU handler, which, in turn, calls a function which causes the results to be presented on display 87. Controller 30 then instructs the far end data set to terminate the transmit loss test and upon receiving confirmation of same, instructs it to leave the test mode.

Although a specific embodiment of an invention is shown and described herein, this merely illustrates the principles of the invention. Those skilled in the art will be able to devise numerous arrangements embodying these principles without departing from their spirit and scope.

We claim:

1. A data set for processing data applied to said data set to generate transmit telephone voiceband data signals representing said data, said data set characterized by signal processing means which includes a plurality of addressable registers, a bus common to said registers, and controller means for addressing said registers for writing into each register via said bus at least a first associated information signal, the values of the information signals in said registers specifying the manner in which said data are to be processed, said signal processing means further including circuit means distinct from said controller means for processing said data in accordance with said information signal values to generate said transmit telephone voiceband data signals, and means for applying said transmit telephone voiceband data signals to a telephone line.

2. A data set for processing received telephone voiceband data signals applied to said data set to recover far-end data characterized by signal processing means which includes a plurality of addressable registers, a bus common to said registers, and controller means for addressing said registers and for writing into each register via said bus at least a first associated information signal, the values of the information signals in said registers specifying the manner in which said received telephone voiceband data signals are to be processed, said signal processing means further including circuit means distinct from said controller means for processing said received telephone voiceband data signals in accordance with said information signal values to recover said far-end data.

3. A data set for processing data applied to said data set to generate transmit telephone voiceband data signals representing said data, and for processing received telephone voiceband data signals applied to said data set to recover far-end data characterized by signal processing means which includes a first plurality of addressable registers and a second plurality of addressable registers a bus common to said first and second pluralities of addressable registers, and controller means for addressing said registers and for writing into each register via said bus at least a first associated information signal, the values of the information signals in said first plurality registers specifying the manner in which said data are to be processed and the values of the information signals in said second plurality registers specifying the manner in which said received telephone voiceband data signals are to be processed, said signal processing means further including circuit means distinct from said controller means for processing said data in accordance with the information signal values in said first plurality registers to generate said transmit telephone voiceband data signals and for processing said received telephone voiceband data signals in accordance with the information signal values in said second plurality registers to recover said far-end data, and means for applying said transmit telephone voiceband data signals to a telephone line.

4. The invention of claims 1 or 2 wherein said controller means includes background means operative for repetitively monitoring predetermined signals within said data set and for performing predetermined actions as a function of the values of said predetermined signals.

5. The invention of claim 4 wherein said signal processing means further includes means for generating an interrupt signal in response to at least a first predetermined signal event within said signal processing means and wherein said controller means further includes interrupt service means for suspending the operation of said background means in response to the generation of said interrupt signal and for writing predetermined information signals into the associated ones of said registers, the values of said predetermined information signals being associated with said signal event.

6. The invention of claim 5 wherein said background means includes means for identifying said predetermined information signal values.

7. The invention of claim 4 wherein said background means includes means (901) for checking the integrity of the circuitry of said data set and for providing an indication if a fault in said circuitry is detected.

8. The invention of claims 1, 2 or 3 wherein at least ones of said information signals specify operating modes for said signal processing means.

9. The invention of claims 1, 2 or 3 wherein at least ones of said information signals specify operating parameter values for said signal processing means.

10. The invention of claims 1, 2 or 3 wherein at least ones of said information signals specify signal processing formats for said signal processing means.

11. The invention of claims 1, 2 or 3 wherein said circuit means includes means for performing at least a portion of said processing in response to a set of program instructions stored within said circuit means, and means adapted to receive said program instructions from said controller means prior to initiation of said processing.

12. A data set comprising signal processing means including means for encoding user-provided data in accordance with at least a specified one of a plurality of predetermined encoding formats, and means for applying to a voiceband telephone channel a transmit data signal generated in response to the encoded data in accordance with a specified one of a plurality of predetermined modulation formats useable over voiceband telephone channels, said signal processing means further including a plurality of registers, a bus common to said registers, and a stored-program-controlled processor distinct from said signal processing means and including means for writing information signals into ones of said registers via said bus, ones of said information signals specifying to said signal processing means said encoding and modulation formats.

13. The invention of claim 12 wherein said data set further comprises a request-to-send lead, the signal on which has a first value if the user desires to provide data to said signal processing means and a second value otherwise, and means for generating an interrupt signal when the signal on said request-to-send lead switches to said first value, said signal processing means is controllable in response to other predetermined information signals written into others of said registers to generate a predetermined start-up signal and to apply said start-up signal to said channel ahead of said transmit data signal, said processor further includes background means operative for detecting faults in at least predetermined portions of the circuitry comprising said data set and means for performing predetermined actions when such faults are detected, and said processor further includes interrupt service means operative in response to said interrupt signal for suspending the operation of said background means and for controlling said signal processing means to generate said start-up signal by writing said other predetermined information signals into said others of said registers.

14. The invention of claims 12 or 13 wherein ones of said predetermined encoding formats are scrambling formats and others of said predetermined encoding formats are differential encoding formats.

15. The invention of claim 14 wherein at least one of said predetermined modulation formats is a phase-shift-keying format and at least another is a quardature-amplitude-modulation format.

16. The invention of claim 15 wherein others of the information signals written into said ones of said registers specify bit and baud rates.

17. A data set comprising said processing means including means for demodulating a passband data signal received by said data set from a voiceband telephone channel, said passband data signal representing encoded data, and for decoding the demodulated signal in accordance with at least a specified one of a plurality of predetermined decoding formats, said signal processing means further including a plurality of registers, a bus common to said registers, and a stored-program-controlled processor distinct from said signal processing means and including means for writing information signals into ones of said registers via said bus, ones of said information signals specifying to said signal processing means said decoding formats.

18. The invention of claim 17 wherein said data set further comprises means for generating an interrupt signal in response to reception of said data signal, said signal processing means is controllable in response to other predetermined information signals written into others of said registers to process an initial portion of said data signal to initiate the operation of said demodulating and decoding means, said processor further includes background means operative for detecting faults in at least predetermined portions of the circuitry comprising said data set and means for performing predetermined actions when such faults are detected, and said processor further includes interrupt service means operative in response to said interrupt signal for suspending the operation of said background means and for controlling said signal processing means to process said initial portion by writing said other predetermined information signals into said other of said registers.

19. The invention of claims 12, 13, 17 or 18 wherein others of the information signals written into said ones of said registers specify bit and baud rates.

20. The invention of claims 17 or 18 wherein ones of said predetermined decoding formats are descrambling formats and others of said predetermined decoding formats are differential decoding formats.

21. The invention of claim 20 wherein others of the information signals written into said ones of said registers specify bit and baud rates.

22. A data set which includes transmitter means operative for generating in response to near-end data a data signal representing said near-end data and adapted for transmission over a voiceband telephone channel, said transmitter means including a plurality of individual circuits each of which has at least two selectable operating modes, and further including means for appying said data signal to a voiceband telephone channel, initialization means operative for placing at least ones of said circuits in respective initial ones of said operating modes, background means operative subsequent to the operation of said initialization means, said background means including means for monitoring predetermined signals within said data set and operative in response to a determination from the values of ones of the monitored signals that a fault exists in said data set for providing a fault indication, means for generating an interrupt signal in response to an indication from a source external to said data set that operation of said transmitter means is desired, and interrupt service means operative in response to said interrupt signal for suspending the operation of said background means and for controlling the operating modes of at least ones of said transmitter circuits in such a way as to effect a start-up operation of said transmitter means.

23. A data set which includes receiver means operative for recovering far-end data from a data signal representing said far-end data and received from a voiceband telephone channel, said receiver means including a plurality of individual circuits each of which has at least two selectable operating modes, initialization means operative for placing at least ones of said circuits in respective initial ones of said operating modes, background means operative subsequent to the operation of said initialization means, said background means including means for monitoring predetermined signals within said data set and operative in response to a determination from the values of ones of the monitored signals that a fault exists in said data set for providing a fault indication, means for generating an interrupt signal in response to the initial reception of said data signal, and interrupt service means operative in response to said interrupt signal for suspending the operation of said background means and for controlling the operating modes of at least ones of said receiver circuits in such a way as to effect start-up operation of said receiver means.

24. A data set which includes transmitter means operative for generating in response to near-end data a data signal representing said near-end data, said transmitter means including means for applying said data signal to a voiceband telephone channel, receiver means operative for recovering far-end data from a data signal representing said far-end data received from a voiceband telephone channel, said transmitter means and said receiver means each including a plurality of individual circuits each of which has at least two selectable operating modes, initialization means operative for placing at least ones of said circuits in respective initial ones of said operating modes, background means operative subsequent to the operation of said initialization means, said background means including means for monitoring predetermined signals within said data set and operative in response to a determination from the values of ones of the monitored signals that a fault exists in said data set for providing a fault indication, means for generating a first interrupt signal in response to an indication from a source external to said data set that operation of said transmitter means is desired, means for generating a second interrupt signal in response to the initial reception of said received data signal, and interrupt service means operative in response to said first and second interrupt signals for suspending the operation of said background means and for controlling the operating modes of ones of said circuits in such a way as to effect start-up operations of said transmitter means and said receiver means, respectively.

25. The invention of claims 22, 23 or 24, wherein said background means further includes means for monitoring user-controlled signals the values of which are indicative of respective actions to be executed by said data set and means responsive to each said value for initiating the execution of the respective action.

26. The invention of claim 25 wherein at least one of said user-controlled signals is indicative of a test to be performed by said data set.

27. The invention of claim 25 wherein at least one of said user-controlled signals is indicative of a change to be made in the operating mode of at least one of said circuits.

28. The invention of claims 23 or 24 wherein said background means further includes means for monitoring at least a fire signals within said data set indicative of predetermined parameter of said received data signal and, if said parameter is not within predetermined limits, for initiating remedial action to bring said parameter within said limits.

29. The invention of claim 28 wherein said receiver means is adapted to operate utilizing a plurality of alternative signal processing formats and wherein said remedial action includes causing said receiver means to operate with at least one changed operating mode or signal processing format.

30. The invention of claim 24 wherein said interrupt service means is operative for effecting at least one of said start-up operations in at least two alternate ways depending on the current operating mode of at least one of said circuits and wherein said background means further includes means for predetermining for said interrupt service means, as a function of said current operating mode, which of said alternate start-up operations is to be effected.

31. The invention of claims 22, 23 or 24 wherein the operating modes of at least one of said circuits are "on" and "off".

32. The invention of claims 22, 23 or 24 wherein at least one of said circuits distributes timing signals to others of said circuits and has as at least ones of its operating modes the generation of said timing signals in response to respective timing sources.

33. The invention of claims 22 or 24 wherein at least one of said circuits obtains said near-end data and has as ones of its operating modes the obtaining of said near-end data from respective data sources.

34. The invention of claim 33 wherein one of said data sources provides as said near-end data at least a first predetermined start-up data signal.

35. The invention of claims 23 or 24 wherein one of said circuits is an equalizer which has as first and second ones of its operating modes the setting of the coefficients of said equalizer to first and second initial sets of values, respectively.

36. The invention of claims 23 or 24 wherein one of said circuits is an equalizer which has as one of its operating modes the updating of its coefficients in response to ideal reference data and as another of its operating modes the updating of said coefficients in response to data decisions made by said receiver means.

37. The invention of claims 23 or 24 wherein one of said circuits is an equalizer which has a normal operating mode, a start-up mode, and a retrain mode.

38. The invention of claim 24 wherein at least one of said transmitter and receiver means operates at least in part in response to a predetermined set of stored program instructions and wherein said initialization means is further operative for providing said program instructions to said one of said transmitter and receiver means.

39. The invention of claim 24 wherein at least one of said transmitter and receiver means is adapted to operate in accordance with a plurality of alternative signal processing formats and wherein said initialization means is further operative for specifying initial ones of said formats.

40. The invention of claim 39 wherein said plurality of signal processing formats includes scrambling formats, differential encoding formats and modulation formats.

41. The invention of claim 39 wherein said plurality of signal processing formats includes descrambling and differential decoding formats.

42. The invention of claim 41 wherein said plurality of signal processing formats further includes scrambling formats, differential encoding formats, and modulation formats.

43. The invention of claims 39, 40 or 41 wherein said interrupt service means is adapted to specify at least one of said signal processing formats to be used during at least one of said start-up operations.

44. The invention of claim 24 wherein at least one of said transmitter and receiver means is adapted to operate with alternative values for each of a plurality of operating parameters and wherein said initialization means is further operative for specifying initial ones of said parameter values.

45. The invention of claim 44 wherein one of said parameter values is a bit rate.

46. The invention of claim 44 wherein one of said parameter values is a baud rate.

47. The invention of claim 44 wherein one of said parameter values is a carrier frequency.

*48. A data set for processing data applied to said data set to generate transmit data signals representing said data, said data set characterized by*

*signal processing means which includes a plurality of addressable registers,*

*a bus common to said registers, and*

*controller means for addressing said registers and for writing into each register via said bus at least a first associated information signal, the values of the information signals in said registers specifying the manner in which said data are to be processed,*

*said signal processing means further including circuit means distinct from said controller means for processing said data in accordance with said information signal values to generate said transmit data signals, and means for applying said transmit data signals to a transmission line.*

*49. The invention of claim 48 wherein at least ones of said information signals specify operating modes for said signal processing means.*

*50. The invention of claim 48 wherein at least ones of said information signals specify operating parameter values for said signal processing means.*

*51. The invention of claim 48 wherein at least ones of said information signals specify signal processing formats for said signal processing means.*

*52. A data set for processing received data signals applied to said data set to recover far-end data characterized by*

*signal processing means which includes a plurality of addressable registers,*

*a bus common to said registers, and*

*controller means for addressing said registers and for writing into each register via said bus at least a first associated information signal, the values of the information signals in said registers specifying the manner in which said received data signals are to be processed,*

*said signal processing means further including circuit means distinct from said controller means for processing said received data signals in accordance with said information signal values to recover said far-end data.*

*53. The invention of claim 52 wherein at least ones of said information signals specify operating modes for said signal processing means.*

*54. The invention of claim 52 wherein at least ones of said information signals specify operating parameter values for said signal processing means.*

*55. The invention of claim 52 wherein at least ones of said information signals specify signal processing formats for said signal processing means.*

*56. A data set for processing data applied to said data set to generate transmit data signals representing said data, and processing received data signals applied to said data set to recover far-end data characterized by*

*signal processing means which includes a first plurality of addressable registers and a second plurality of addressable registers,*

*a bus common to said first and second pluralities of addressable registers, and*

*controller means for addressing said registers and for writing into each register via said bus at least a first associated information signal, the values of the information signals in said first plurality registers specifying the manner in which said data are to be processed and the values of the information signals in said second plurality registers specifying the manner in which said received data signals are to be processed,*

*said signal processing means further including circuit means distinct from said controller means for processing said data in accordance with the information signal values in said first plurality registers to generate said transmit data signals and for processing said received data signals in accordance with the information signal values in said second plurality registers to recover said far-end data, and means for applying said transmit data signals to a transmisson line.*

*57. The invention of claim 56 wherein at least ones of said information signals specify operating modes for said signal processing means.*

*58. The invention of claim 56 wherein at least ones of said information signals specify operating parameter values for said signal processing means.*

*59. The invention of claim 56 wherein at least ones of said information signals specify signal processing formats for said signal processing means.*

*60. A data set comprising*

*signal processing means including means for encoding user-provided data in accordance with at least a specified one of a plurality of predetermined encoding formats and means for applying to a transmission channel a transmit data signal representing the encoded data, said signal processing means further including a plurality of registers,*

*a bus common to said registers, and*

*a stored-program-controlled processor distinct from said signal processing means and including means for writing information signals into ones of said registers via said bus, ones of said information signals specifying to said signal processing means said at least one format.*

*61. A data set comprising*

*signal processing means including means for receiving a data signal from a transmission channel, said data signal representing encoded data, and means for decoding the received signal in accordance with at least a specified one of a plurality of predetermined decoding formats, said signal processing means further including a plurality of registers,*

*a bus common to said registers, and*

*a stored-program-controlled processor distinct from said signal processing means and including means for writing information signals into ones of said registers via said bus, ones of said information signals specifying to said signal processing means said at least one of said decoding formats.*

* * * * *